US006193912B1

(12) United States Patent
Thieste et al.

(10) Patent No.: US 6,193,912 B1
(45) Date of Patent: Feb. 27, 2001

(54) NEAR INFRARED-ABSORBING ELECTROCHROMIC COMPOUNDS AND DEVICES COMPRISING SAME

(75) Inventors: Dave Thieste, Byron Center; Harlan J. Byker, Holland; Kelvin Baumann, Holland; Ramanujan Srinivasa, Holland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/034,531

(22) Filed: Mar. 3, 1998

(51) Int. Cl.$^7$ ............... G02F 1/00; G02F 1/153
(52) U.S. Cl. ............... 252/583; 359/265; 359/267; 359/272; 359/273; 359/275
(58) Field of Search ............... 252/583; 359/265, 359/267, 272, 273, 275

(56) References Cited

U.S. PATENT DOCUMENTS

| | | | |
|---|---|---|---|
| 3,341,464 | 9/1967 | Susi et al. ............... | 252/300 |
| 4,402,573 | 9/1983 | Jones ............... | 350/357 |
| 4,902,108 | 2/1990 | Byker ............... | 350/357 |
| 5,140,455 | 8/1992 | Varaprasad et al. ............... | 350/357 |
| 5,145,609 | * 9/1992 | Varaprasad et al. ............... | 252/583 |
| 5,239,406 | 8/1993 | Lynam ............... | 359/275 |
| 5,679,283 | * 10/1997 | Tonar et al. ............... | 252/583 |
| 5,928,572 | * 7/1999 | Tonar et al. ............... | 252/583 |

FOREIGN PATENT DOCUMENTS

| | | | |
|---|---|---|---|
| 94301365 | 2/1994 | (EP) ............... | C09K/9/02 |
| 0 612 826 | 8/1994 | (EP) . | |
| 63-50883 | 10/1997 | (JP) ............... | C07C/50/87 |
| 830456 A1 | 10/1997 | (SU) ............... | C07D/20/12 |
| WO 94/23333 | 10/1994 | (WO) ............... | G02F/1/15 |
| PCT/US95/ 09215 | 7/1995 | (WO) ............... | C09K/9/02 |
| WO 97/30134 | 8/1997 | (WO) ............... | C09K/9/02 |

OTHER PUBLICATIONS

Habib, MA., *Electrochemistry in Transition*, 1992, pp. 51–62.
H. Yamamoto et al., A Multicolor Electrochromic Display Using Phthalocyanine Films with Solid Electrolyte, (Session 4—ECDs and Other Technology, Japan Display '86), (1986).
A. Yasuda et al., An Electrochromic Display Using Viologen–Cyclodextrin Inclusion Complex, (Session 4—ECDs and Other Technology, Japan Display '86), 1986).
O. Takai., A New Electrochromic System Using Tin Nitride Thin Films, (Session 4—ECDs and Other Technology, Japan Display '86), (1986).
N. Baba, et al., An Electrochemical Method of Preparing $IrO_x$ Thin Films and $SnO_2$ Electrodes, (Session 4—ECDs and Other Technology, Japan Display '86, (1986).
V. M. Domingo et al., Inert Carbon Free Radicals. 14. Synthesis, Isolation and Properties of Two Strongly Π—Π Interacting Mixed–Valence Compounds: The Perchloro–4, 4'–ethynylenebis(triphenylmethyl) Anion Radical Potassium (18–Crown–6) Salt and the Perchloro–α–α–α'–α'–tetraphenyl–p–xylene Anion Radical Tetrabutylammonium Salt, Chem. Mater. 1997, 9, 1620–1629.

(List continued on next page.)

Primary Examiner—Philip Tucker
(74) Attorney, Agent, or Firm—Brian J. Rees; Factor and Partners, LLC

(57) ABSTRACT

Electrochromic compounds capable of reversibly attenuating the transmittance of the near infrared portion of the electromagnetic spectrum are provided. These compounds exhibit an energy difference between the singly occupied molecular orbital (SOMO) energy and the highest doubly occupied molecular orbital (HDOMO) energy ($E_{SOMO} - E_{HDOMO}$) of less than about 3.6 eV. In addition, these compounds have a transition moment of the configuration made up of the HDOMO and SOMO that is "long axis polarized".

39 Claims, 6 Drawing Sheets

OTHER PUBLICATIONS

G. A. Sotzing et al., Multiply Colored Electrochromic Carbaxole–Based Polymers, Chem. Mater. 1997,9,1578–1587.

N. Leventis, Polymers in Electrochromics, Polymer News, 1995, vol.20, pp. 5–18.

J. Guay et al., Electrooxidation of Soluble α–α –Coupled Thiophene Oligomers, Chem. Mater. 1992, 4, 254–255.

S. A. Sapp et al., Rapid Switching In Electrochromic Devices Based On Complementary Conducting Polymer Films, ACS New Orleans, Spring 1996, Polymer Preprint.

M. K. Carpenter et al., A Single–Film Electrochromic Devices, J. Electrochem. Soc., vol. 137, No. 8, 1990, pp. 2464–2467.

S. Kuwabata, et al., Redox Behavior and Electrochromic Properties of Polypyrrole Films in Aquious Solutions, Bull. Chem. Soc. Jpn., vol. 57, No.8, 1984, pp. 2247–2253.

K. Lahlil et al., Intervalence Transitions In Mixed Valence Bis(tetrathiofulvalene) Compounds, J. Am. Chem. Soc. 1995, 117, 9995–10002.

J. Stepp et al., Electrochromism and Electrocatalysis in Viologen Polyelectrolyte Multilayers, J. Electrochem. Soc., vol. 144, No. 6, 1997, pp. L155–L157.

S. Hunig et al., Conjugated Radicals IX, Experimental Study of the LCI SCF Open Shell Calculations on the Electronic Spectra and the Redox Equilibria of the Nitrogen–Containing Violenes, The Journal of Physical Chemistry, vol. 75, No. 3, 1971, pp. 335–339.

Yuan Yu et al., Spectra and Reactivly of MeThoxyoligothiophene Cation Radicals, J. Am. Chem. Soc. 1996, vol. 118, No. 5, 1013–1018.

Masaoski, F. et al., Photoreduction of Bisviologen Compounds, Viologen–$(CH_2)_n$—Viologen, by 2–propanol, Bull. Chem. Soc. Jpn. vol. 55, No. 2, 513–516, (1982).

* cited by examiner

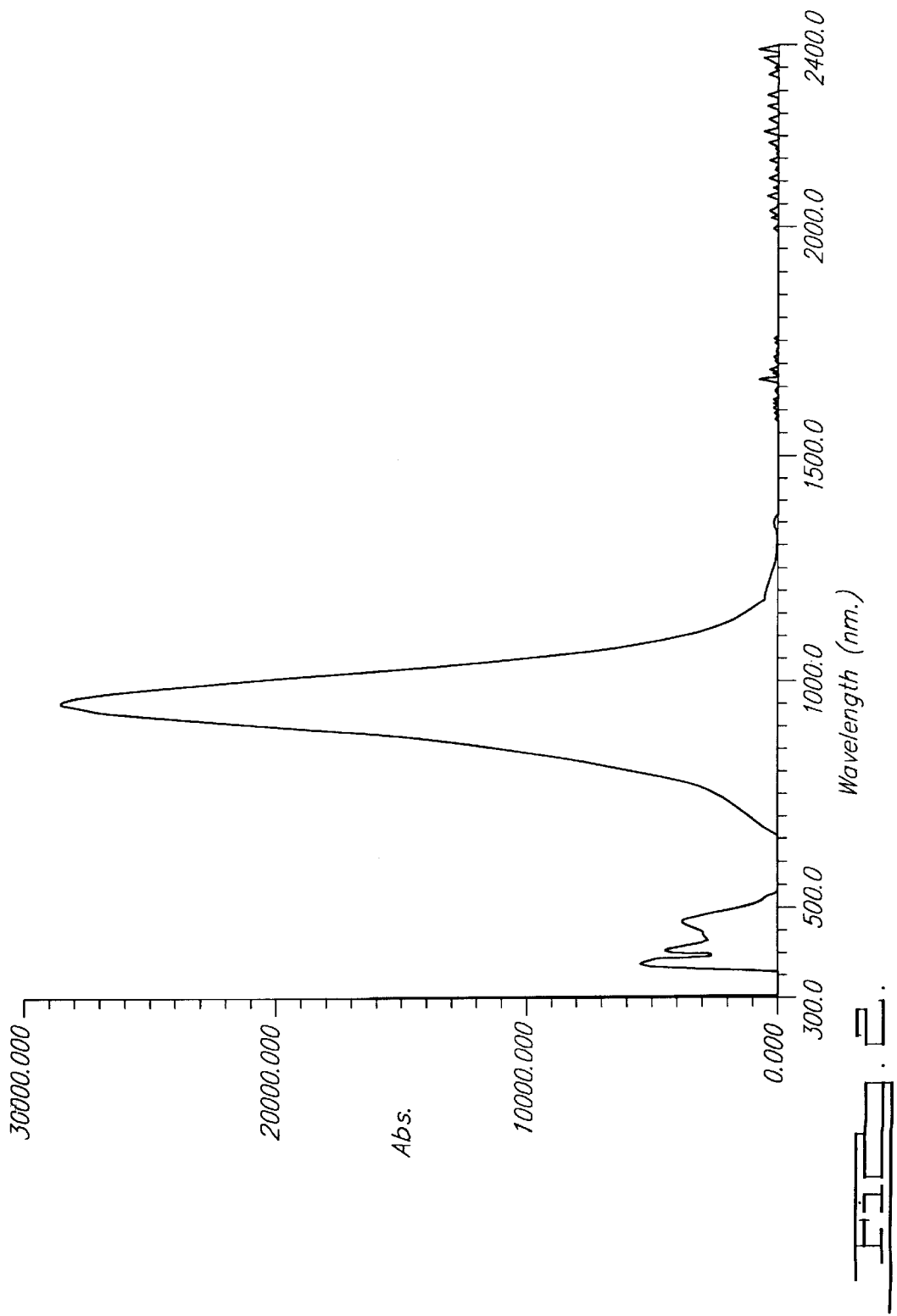

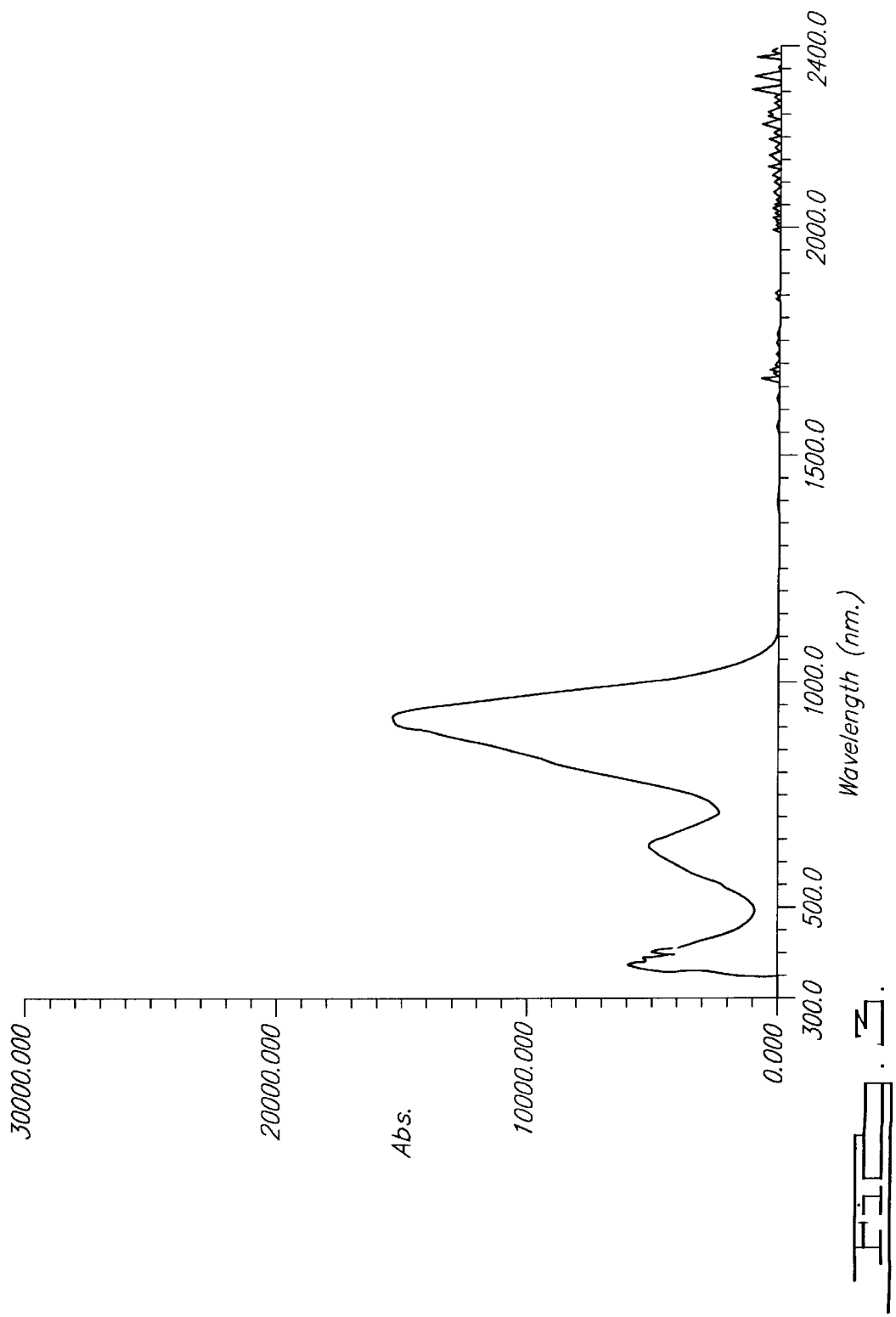

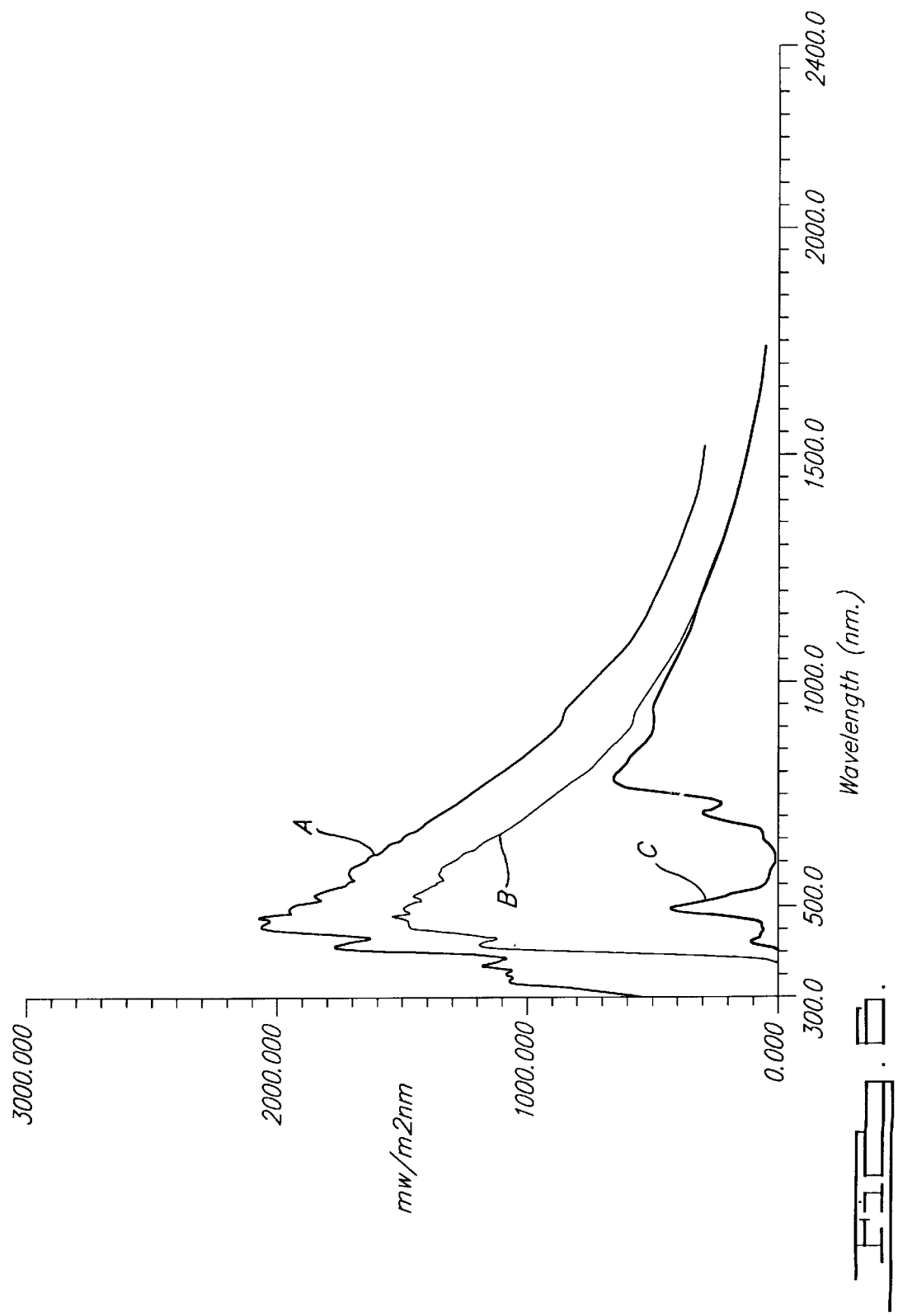

NEAR INFRARED-ABSORBING ELECTROCHROMIC COMPOUNDS AND DEVICES COMPRISING SAME

BACKGROUND

The invention relates to electrochromic compounds capable of attenuating the transmittance of the near infrared portion of the electromagnetic spectrum and, more particularly to electrochromic devices comprising an electrochromic medium that has at least one electrochromic compound capable of reversibly attenuating the transmittance of the near infrared portion of sunlight.

Electrochromic windows have been proposed for many years to attenuate the amount of sunlight that is transmitted into a building. It would be advantageous during the summer months to decrease the total amount of solar energy entering a building, and increase the total amount of solar energy entering a building during the winter months. This would provide a substantial energy savings for interior space heating and air-conditioning. C. G. Granqvist states, in the "Handbook of Inorganic Electrochromic Materials", Elsevier N.Y. (1995), that $WO_3$ in its crystalline and highly doped form exhibits a change in reflectance in the near-infrared portion of the electromagnetic spectrum. Several organic polymers show changes in absorbance in the near-infrared range. In the discussions herein, near infrared, or "NIR" is defined as electromagnetic radiation in the range of about 750–2400 nm. Most commercial electrochromic systems have been designed to attenuate only the visible portion of the solar spectrum. Since solar energy is, on the average, 7.9% ultraviolet (UV), 45.5% visible radiation, and 46.7% near-infrared (NIR) radiation, over one-half of the total solar energy is not in the visible portion of the spectrum.

In U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker, which is incorporated herein in its entirety by reference, solutions of electrochromic compounds are described. These solutions are useful as the media of variable transmittance in electrochromic devices. The devices, in turn, are useful as the variable transmittance components in variable transmission light filters, such as windows, and variable reflectance mirrors, such as anti-glare rearview mirrors in automobiles.

Described in the aforementioned patent are components of the formula:

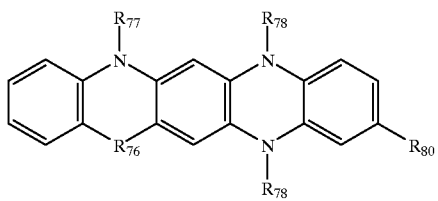

(LII)

wherein $R_{76}$ is oxygen or sulfur $R_{80}$ is hydrogen or dialkylamino, wherein the alkyl groups are the same or different and are each of 1 to 6 carbon atoms, and $R_{77}$ and $R_{78}$ are the same or different and are each selected from hydrogen, alkyl of 1 to 6 carbon atoms, phenyl optionally substituted at any one position with an alkyl group of 1 to 6 carbon atoms, and benzyl, optionally substituted at any one position of the phenyl group with an alkyl group of 1 to 6 carbon atoms. Components of this formula generally have redox potentials below about 90 mV (using $E_{1/2}(1)$ of 5,10-dimethyl-5,10-dihydrophenazine in propylene carbonate equal to 0.300V as an arbitrary reference), $E_{SOMO}-E_{HDOMO}$ values below 3.6 eV, and dipole moment configurations that are long axis polarized. U.S. Pat. No. 4,802,108 teaches nothing of NIR absorption, nor does it teach that the electrochromic compounds disclosed therein, including those shown in compound LII, absorb in the NIR portion of the electromagnetic spectrum. Additionally, this patent teaches nothing of using the $E_{SOMO}-E_{HDOMO}$ or the dipole moment configuration as criteria for identifying NIR absorbing compounds.

There has existed a need, then, to provide an electrochromic system that will provide reversibly variable transmittance in both the visible and near infrared portions of the solar spectrum. One device in which an electrochromic device acts as an adjustable solar energy barrier is disclosed in U.S. Pat. No. 5,239,406, entitled "Near-Infrared Reflecting, Ultraviolet Protected, Safety Protected, Electrochromic Vehicular Glazing," N. R. Lynam discusses the use of the Cardinal Heat Mirror, which comprises a thin metal film, as a near IR reflector. In this example, three glass elements are used—two to make up the electrochromic cell and a third glass element that has the thin metal film and is attached to one side of the electrochromic cell. Such a design is complicated and expensive to manufacture. Moreover, the IR reflectance is permanent, and only the visible transmittance is "adjustable". Rather than having a permanent IR reflector, it would be desirable to enable modulation of near infrared radiation in order to take advantage of heat gain in winter. In an article titled "Electrochromic Devices: A Comparison Of Several Systems" *Solar Energy Materials and Solar Cells*, 39 (1995) 213–222, C. Arbizzani et al. discuss the use of poly(alkylthiophenes), poly (pyrroledodecylsulfate) and tungsten oxide in various combinations in variable light transmission electrochromic devices and suggest that these systems may be useful to regulate the solar energy flux to provide energy savings in buildings.

Devices based on these materials have not, to date, surpassed the use of devices based on solution-phase organic materials in the market, generally because of their lack of stability and high cost. It would be advantageous to have a solution-phase electrochromic compound that in its inactivated state would be colorless or nearly colorless and, when activated or colored, would absorb in the NIR (and preferably also in the visible) portion of the solar spectrum, and additionally have appropriate stability, cost and appearance to be aesthetically pleasing to a building occupant. However, an acceptable compound must also satisfy a number of other requirements. For example, the compound must be sufficiently soluble in electrochromic compositions, and must not interact with other components in the composition in a way that interferes with using the composition for its intended purpose. Thus, if the compound is to be used in a solution employed as a medium of variable transmittance to visible and NIR light in an electrochromic device, it must not interact with the other electrochromic compounds or other components of the medium in a way such that they cease to function effectively in the medium.

In addition to providing suitable NIR electrochromic compounds, it would also be advantageous to set forth physiochemical characteristics that one may use to identify new materials with near infrared absorbencies. Consequently, it is desirable to provide a set of criteria to identify electrochromic compounds that would be stable in an electrochromic medium as a part of an electrochromic device capable of reversibly changing its absorbance at wavelengths between 750 nm and 2400 nm. In addition, it is desirable to provide electrochromic devices using these NIR absorbing compounds.

OBJECTS OF THE INVENTION

Accordingly, a primary object of the present invention is to provide electrochromic compounds that absorb in the NIR portion of the electromagnetic spectrum when activated or colored.

Another object of the present invention is to provide an improved electrochromic device that reversibly attenuates the NIR and visible portions of the electromagnetic spectrum and thus can be used as a variable solar energy barrier.

Yet another object of the present invention is to provide a straightforward set of characteristics that identify compounds useful as an electrochromic compound capable of absorbing in the NIR portion of the electromagnetic spectrum.

SUMMARY OF THE INVENTION

It has now been surprisingly discovered that electrochromic compounds suitable for the reversible attenuation of radiant energy in the near IR portion of the spectrum are aromatic organic compounds having molecular orbitals such that the difference between the singly occupied molecular orbital ("SOMO") energy level and the highest doubly occupied molecular orbital ("HDOMO") energy level ($E_{SOMO}-E_{HDOMO}$) is less than 3.6 eV, and the transition moment of the configuration made up of the HDOMO and SOMO is additionally long axis polarized.

BRIEF DESCRIPTION OF THE DRAWINGS

The subject matter, which is regarded as the invention, is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 2 shows a graph of the absorbance versus wavelength for the cation radical of 3,7 bis(dimethylamino)-10-methylphenathiazine in propylene carbonate;

FIG. 3 shows a graph of the absorbance versus wavelength for the cation radical of 3-dimethylamino-7-methoxy-10-methylphenothiazine in propylene carbonate;

FIG. 6 shows a graph of the mW per square meter per nanometer versus wavelength for an electrochromic device containing 5,10-dimethyl-5,10-dihydrophenazine combined with 1,1'-bis(3-phenyl(n-propyl))-4,4'-dipyridinium bis (tetrafluoroborate) and propylene carbonate.

DETAILED DESCRIPTION

Figure 1:
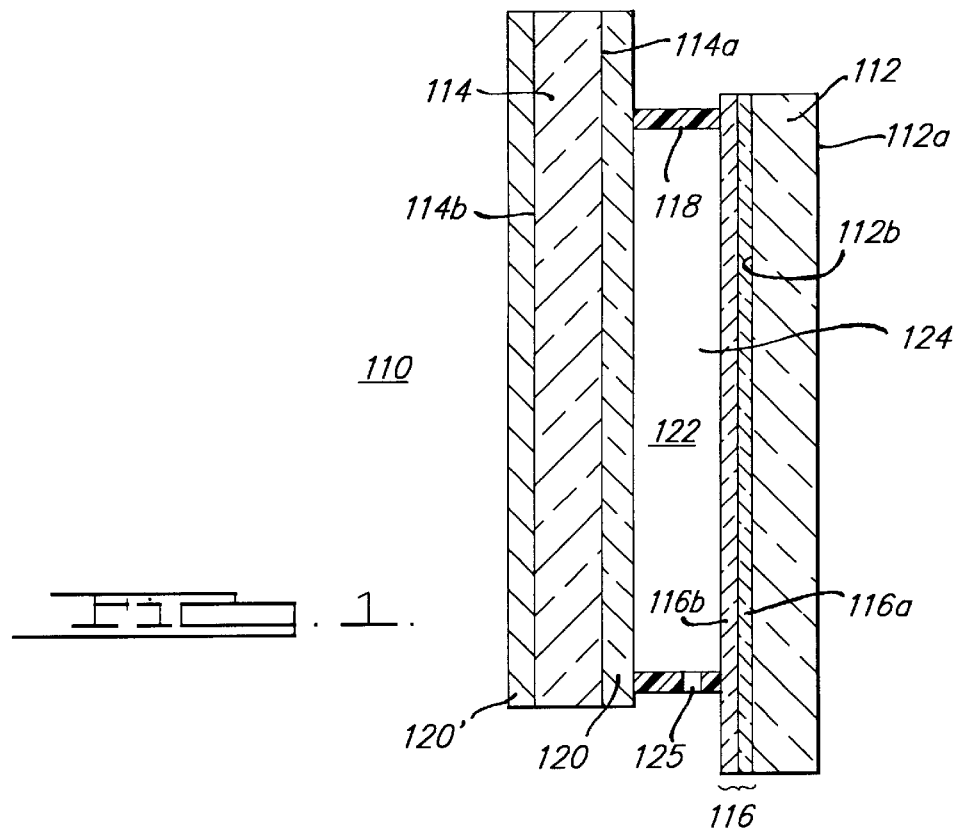
FIG. 1 is an enlarged cross-sectional view of an electrochromic device having an electrochromic medium of the present invention that comprises at least one electrochromic compound capable of attenuating the transmittance of the near infrared portion of the electromagnetic spectrum.

FIG. 1 shows a cross-sectional view of an electrochromic device 110, which may be a mirror, a window, a display device, and the like. Device 110 has a front transparent element 112 having a front surface 112a and a rear surface 112b, and a rear element 114 having a front surface 114a and a rear surface 114b. Since some of the layers of the mirror are very thin, the scale has been distorted for pictorial clarity. Also, for clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface.

Front transparent element 112 may be any material which is transparent and has sufficient strength to be able to operate in the conditions, e.g., varying temperatures and pressures, commonly found in the environment of the intended use. Front element 112 may comprise any type of borosilicate glass, soda lime glass, float glass or any other material, such as, for example, a polymer or plastic, that is transparent in the visible region of the electromagnetic spectrum. Front element 112 is preferably a sheet of glass with a thickness ranging from 0.5 millimeters (mm) to about 12.7 mm. Rear element 114 must meet the operational conditions outlined above, except that if the electrochromic device is a mirror, rear element 114 does not need to be transparent, and therefore may comprise polymers, metals, glass, ceramics, and preferably is a sheet of glass with a thickness ranging from 0.5 mm to about 12.7 mm.

One or more layers of a transparent electrically conductive material 116 are deposited on the second surface 112b to act as an electrode. Transparent conductive material 116 is desirably a material that: is substantially transparent to visible light; bonds well to front element 112 and maintains this bond when the sealing member 118 bonds thereto; is resistant to corrosion by any materials within the electrochromic device; is resistant to corrosion by the atmosphere; and has minimal diffuse or specular reflectance and good electrical conductance. Transparent conductive material 116 may be fluorine doped tin oxide (FTO), tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD A G, Alzenau, Germany, and the materials described in above-referenced U.S. Pat. No. 5,202, 787, such as TEC 20 or TEC 15, available from Libbey Owens-Ford Co. (LOF) of Toledo, Ohio Co-pending U.S. Patent Application entitled "An Improved Electro-Optic Device Including A Low Sheet Resistance, High Transmission Transparent Electrode" describes a two layer, low sheet resistance, high transmission, scratch resistant transparent electrode that forms strong bonds with adhesives, is not oxygen sensitive, and can be bent to form convex or aspheric electro-optic mirror elements or tempered in air without adverse side effects. The disclosure of this commonly assigned Application is hereby incorporated herein by reference. Similar requirements are needed for the layer 120 deposited onto the third surface 114a, whether it is a transparent conductive material used in electrochromic windows and in mirrors having a fourth surface reflector (120'), or a combined reflector/electrode used in electrochromic mirrors having a third surface reflector, in such case no fourth surface coating is necessary.

If the front and/or rear elements 112 and 114 comprise sheets of glass, the glass can be tempered prior to or subsequent to being coating with the layers of electrically conductive material (116 and 120). This is of particular advantage in the current invention where substantial amounts of the total solar spectrum are absorbed, thus resulting in significant temperature rise in the device and thereby requiring the high strength such as is provided by tempering.

The coating 120 of the third surface 114a is sealably bonded to the coating 116 on the second surface 112b near the outer perimeter by a sealing member 118, thereby defining a chamber 122. Sealing member 118 may be any material which is capable of adhesively bonding the coatings on the second surface 112b to the coatings on the third surface 114a to seal the perimeter such that electrochromic medium 124 does not leak from chamber 122. Optionally, the layer of transparent conductive coating 116 and the layer on the third surface 114a may be removed over a portion where sealing member 118 is disposed, but generally not the entire portion, otherwise the drive potential would be difficult to apply to the two coatings. When the conductive coatings are removed, sealing member 118 must bond well to glass.

The performance requirements for a perimeter seal member 118 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting, or UV curing organic sealing resins are preferred. Such organic resin sealing systems for LCD's are described in U.S. Pat. Nos. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermal curing, for example mixtures of liquid epoxy resin with liquid polyamide resin or dicyandiamide, or may be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability and spacers such as glass beads or rods can be used to control final seal thickness and substrate spacing. Suitable epoxy resins and spacers for use in a perimeter seal member 118 are disclosed in U.S. patent application Ser. No. 08/834,783 now U.S. Pat. No. 5,940,201, entitled "An Electrochromic Mirror With Two Thin Glass Elements And A Gelled Electrochromic Medium", which is hereby incorporated herein by reference.

The electrochromic medium 124 comprises one or both of an anodic electrochromic compound and a cathodic electrochromic compound and may comprise other components as well, as understood in the electrochromic device art. Generally speaking, an anodic electrochromic compound is one, which, upon electrochemical oxidation, increases its absorbance at least one wavelength in the visible spectrum, and a cathodic electrochromic compound is one which, upon electrochemical reduction, increases its absorbance at least one wavelength in the visible range. The preferred compositions of the invention are those which are media of reversibly variable transmittance in single-compartment, solution-phase, self-erasing electrochromic devices, as described in U.S. Pat. No. 4,902,108. In addition, the compounds that make up the electrochromic medium 124 may be chosen to form a pre-selected color when activated. Co-pending U.S. patent application Ser. No. 08/832,596 now U.S. Pat. No. 6,020,987, entitled "An Improved Electrochromic Medium Capable of Producing A Pre-selected Color", describes an improved electrochromic medium comprising at least three electroactive materials having absorption spectra when activated that add together such that the color of the electrochromic medium can be pre-selected by individually choosing the concentrations of the at least three electroactive materials. Also, the electrochromic medium may be solution phase or may have a solution-phase system interspersed in a polymer matrix to form a freestanding gel. U.S. patent application Ser. No. 08/616,967 now U.S. Pat. No. 5,928,572 teaches and claims an improved electrochromic layer which comprises a solvent, a cross-linked polymeric matrix and at least one electrochromic compound in solution in the solvent and interspersed in the polymer matrix. The disclosures of these patents and patent applications, including the references contained therein, are hereby incorporated herein in their entirety by reference.

In accordance with one aspect of present invention, criteria are provided with which to identify electrochromic compounds capable of absorbing in at least the NIR portion of the electromagnetic spectrum. To understand these criteria in more detail, reference is made to semi-empirical molecular orbital methods and the use of these methods to understand and predict the physical properties of molecules. For example, see S. A. Pople and D. L. Beverage, *Approximate Molecular Orbital Theory*, (McGraw-Hill, N.Y.) (1970).

Linear combination of atomic orbital (LCAO) methods generate molecular orbitals based on a combination of atomic orbitals, the molecular orbitals being mathematical solutions to the system Hamiltonian. Using the molecular orbitals as a basis, one can, through a process known as configuration interaction, develop solutions for the excited states of molecules. Starting with the ground configuration, formed by simply filling the lowest energy orbitals with the number of electrons in the system, the electrons are promoted to higher energy unfilled orbitals by absorption of energy to give excited configurations. The energy between the ground and an excited configuration is:

$$X_i = E_j - E_i - J_{ij} + 2K_{ij} \qquad \text{[Equation I]}$$

These configurations are then used to construct the energy states of the molecule. The ground and excited states are written as linear combinations of configurations, along with their energies. By using suitable computer programs, e.g., AMPAC (M. J. S. Dewar, J. Am. Chem. Soc. 90, 1953 [1968]) (QCPE Program 506), one is able to identify potential NIR active compounds by calculating the difference between the singly occupied molecular orbital (SOMO) energy and the highest doubly occupied molecular orbital (HDOMO) energy ($E_{SOMO}-E_{HDOMO}$). It has now been suprisingly discovered that if the energy difference between the SOMO and HDOMO is less than about 3.6 eV, for the AMPAC minimized geometry, the compound will be an efficient NIR absorber in an electrochromic device. As will be discussed in detail below, if the energy difference is less than 3.6 eV, and the transition moment of the configuration made up of the HDOMO and SOMO is "long axis polarized," then the compound will have improved or more intense NIR activity when activated or colored.

The following compounds I, III, V–XXI and XXIII are anodic electrochromic compounds that exhibit these criteria, and compound II, IV and XXII are anodic electrochromic compounds that do not exhibit these criteria. The structures are oriented according to the following coordinate system.

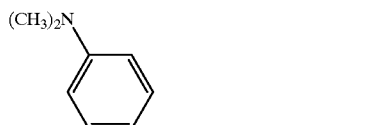

(I)

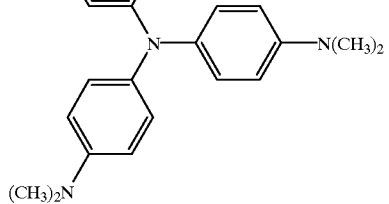

(II)

(III)

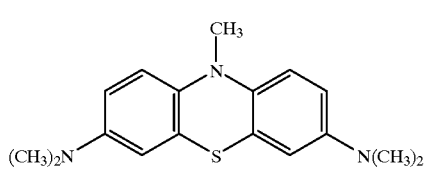

(IV)

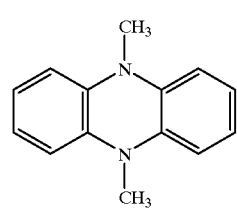

-continued (V)

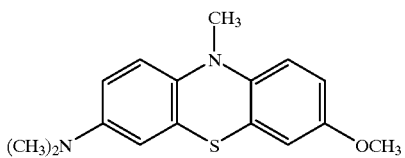

(VI)

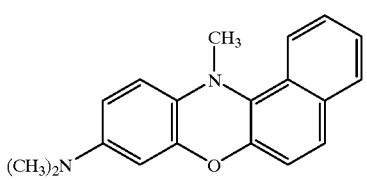

(VII)

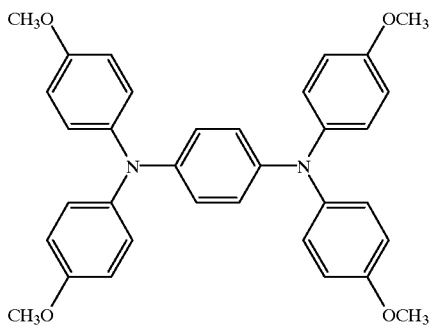

(VIII)

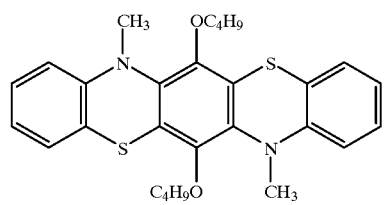

(IX)

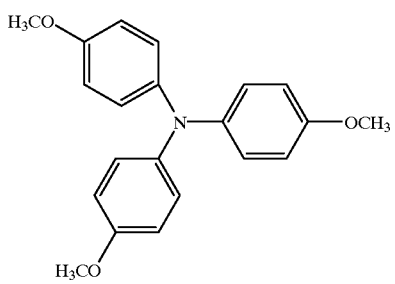

(X)

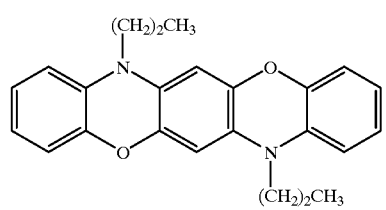

-continued
(XI)
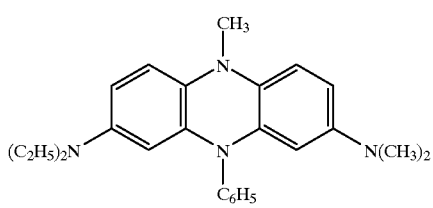
(XII)
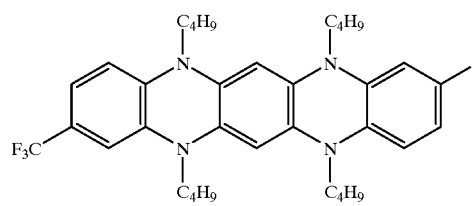
(XIII)
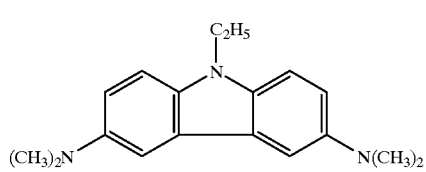
(XIV)
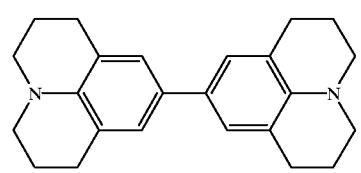
(XV)
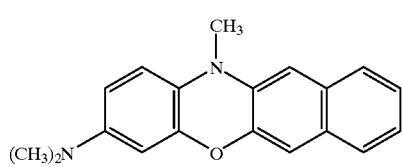
(XVI)
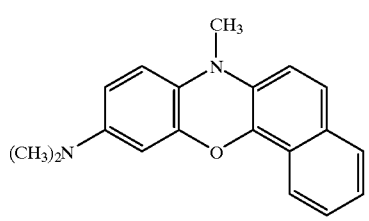
(XVII)
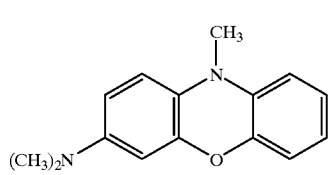
(XVIII)
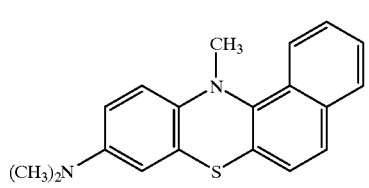
-continued
(XIX)
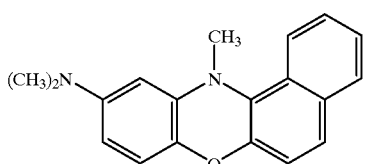
(XX)
(XXI)
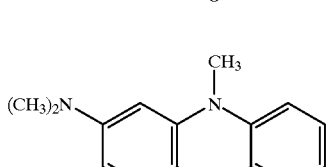
(XXII)
(XXIII)
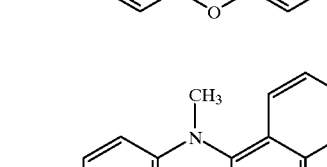
(XXIV)
(XXV)
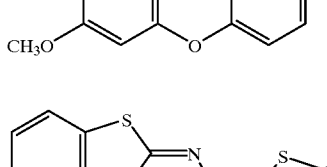
(XXVI)
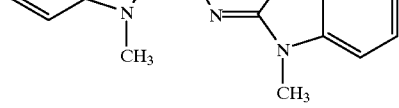

-continued

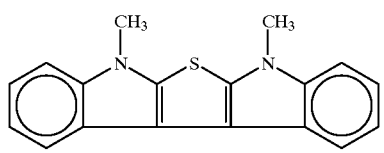

(XXVII)

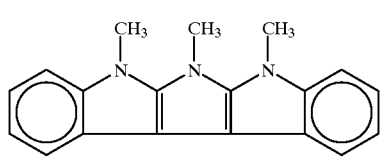

(XXVIII)

Table 1 contains the associated SOMO energy ($E_{SOMO}$) and HDOMO energy ($E_{HDOMO}$) levels (determined using AMPAC calculations), and the $\lambda_{max}$ and associated extinction coefficient ($\epsilon$) values for the lowest energy absorption band of the corresponding cation radical for the above-referenced anodic electrochromic compounds. All spectroscopic data reported here are from the one electron oxidized form of the compounds. The spectra was collected using a window having two fluorine-doped tin oxide electrodes spaced apart approximately 137 microns by a perimeter seal and spacer. The volume inside was then filled with a solution of the anodic material with an equal or excess concentration of a viologen (1,1'-bis(3-phenyl(n-propyl))-4,4'-dipyridinium bis(tetrafluoroborate)) in propylene carbonate. The window was then attached to a DC power supply and a suitable voltage was applied to generate the cation radical (oxidized form) of the anodic material and the cation radical (reduced form) of the viologen which has a known spectrum. The viologen component was then subtracted out of the difference of the inactivated and activated spectra of the device, giving an accurate measure of the wavelength and extinction coefficients for the oxidized, cation radical form of the anodic material.

It is surprising that in this wide variety of compounds, the simple energy difference $E_{SOMO}-E_{HDOMO}$ is a strong predictor of the lowest energy absorption band and that if AE is less than about 3.6 eV the compounds will have NIR activity. All the compounds in Table 1 are anodic, that is, in their fully reduced form they are colorless or nearly colorless, and when an electron is removed, they become colored. The compounds of the present invention, as illustrated by those listed in Table 1, are monomeric structures so there are no repeating units.

Table 1 also includes the redox potentials for compounds I–XIV, XXII and XXIII (using $E_{1/2}(1)$ of 5,10-dimethyl-5,10-dihydrophenazine in propylene carbonate equal to 0.300V as an arbitrary reference). As a general rule, it is preferred that the first redox potential of the anodic compound be greater than about 90–100 mV, on the scale used in this disclosure, since more easily oxidized materials are easily oxidized by atmospheric oxygen making processing difficult. Furthermore, the equilibrium for the electron transfer process, between an anodic compound and cathodic compound in a solution, is governed by the Nernst equation and an oxidation of at least 90–100 mV, combined with a typical aralkyl, bipyridinium compound, which has a reduction potential of approximately 300 mV and will result in a minimal zero potential concentration of oxidized or reduced material.

TABLE 1

| Cation Radial Of Compound | $E_{SOMO}$ | $E_{HDOMO}$ | $E_{SOMO}-E_{HDOMO}$ | $\lambda_{max}$(nm) | $\epsilon$ | $E^{1,2,3/4}_{1}/E^{1/2}_{2}$(eV) |
|---|---|---|---|---|---|---|
| I | −8.11 | −11.16 | 3.05 | 968 | 46,000 | 188/500 |
| II | −8.87 | −13.42 | 4.55 | 615 | 11,000 | 256/796 |
| III | −8.18 | −11.17 | 2.99 | 950 | 28,500 | 272/576 |
| IV | −8.87 | −12.95 | 4.08 | 727 | 1,500 | 300/980 |
| V | −8.41 | −11.74 | 3.33 | 924 | 15,000 | 412/812 |
| VI | −8.80 | −11.97 | 3.17 | 912 | 19,000 | 412/856 |
| VII | −8.08 | −10.95 | 2.87 | 966 | 20,000 | 488/872 |
| VIII | −8.27 | −10.74 | 2.47 | 1,198 | 38,500 | 648/932 |
| IX | −8.85 | −12.10 | 3.25 | 722 | 21,000 at 750 nm | 700/1044 |
| X | −8.64 | −11.61 | 2.97 | 954 | 47,000 | 308/812 |
| XI | −7.82 | −11.01 | 3.19 | 804 | 14,000 | −166/308 |
| XII | −8.23 | −11.21 | 2.98 | 884 | 12,000 | −92/356 |
| XIII | −8.42 | −10.96 | 2.54 | 1694 | 15,000 | 404/476 |
| XIV | −8.20 | −11.08 | 2.88 | | | 316/492 |
| XV | −8.66 | −11.60 | 2.94 | | | |
| XVI | −8.57 | −11.57 | 3.00 | | | |
| XVII | −8.74 | −12.20 | 2.56 | | | |
| XVIII | −8.44 | −11.45 | 3.01 | | | |
| XIX | −8.80 | −11.53 | 2.73 | | | |
| XX | −8.99 | −11.97 | 2.98 | | | |
| XXI | −9.03 | −12.32 | 3.29 | | | |
| XXII | −8.13 | −12.06 | 3.93 | 737 | 10,000 | 652/1105 |
| XXIII | −8.02 | −11.56 | 3.54 | 845 | 16,000 | 524/1002 |
| XXIV | −9.16 | −11.91 | 2.74 | | | |
| XXV | −9.04 | −11.72 | 2.68 | | | |
| XXVI | −8.73 | −12.23 | 3.42 | | | |
| XXVII | −8.75 | −11.85 | 3.09 | | | |
| XXVIII | −8.41 | −11.80 | 3.39 | | | |

Included in Table 1, along with the absorption wavelengths are the molar extinction coefficients ($\epsilon$). Assuming scattering effects are minimal, for a material to be useful in attenuating the solar energy entering a building it is desirable that it have a reasonably strong absorbance in the NIR portion of the electromagnetic spectrum. In the present invention, the NIR portion of the electromagnetic spectrum should be understood to range from about 750 nm to about 2400 nm. The $\epsilon$ values reported in Table 1 should be viewed as approximations to the oscillator strength. As those skilled in the art will appreciate, oscillator strength is a more appropriate value in determining whether a material will be a good IR absorber. We have, however, used the more commonly measured and reported $\epsilon$ values here. Compounds having values for $\epsilon$ of over 10,000 (between 750 and 2400 nm) will be considered strong NIR absorbers, while those having an $\epsilon$ of less than 5,000 (between 750 and 2400 nm) will be considered weak NIR absorbers.

As can be seen from Table 1,3,7-bis(dimethylamino)-10-methylphenothiazine (Compound III) has a HDOMO energy of −11.17 eV, a SOMO energy of −8.18 and a ΔE of 2.99 eV. FIG. 2 is a graph of the absorption versus wavelength for the cation radical of Compound III and shows the $\lambda_{max}$ for this cation radical to be at 950 nm (in the NIR portion of the electromagnetic spectrum). In addition, at 950 nm this compound has an $\epsilon$ of 28,500 which makes this compound, which has only modest visible light absorbance ($\lambda_{max}$=474, $\epsilon$=4000) a good candidate for a NIR absorbing electrochromic compound.

FIG. 3 shows a graph of the absorbance versus wavelength for the cation radical of 3-dimethylamino-7-methoxy-10-methylphenothiazine (compound V) in propylene carbonate and shows the $\lambda_{max}$ for this cation radical to be at 924 nm (in the NIR portion of the electromagnetic spectrum). In addition, at 924 nm this compound has an $\epsilon$ of about 15,000 which makes this compound a good candidate for a NIR absorbing electrochromic compound.

Figure 4:
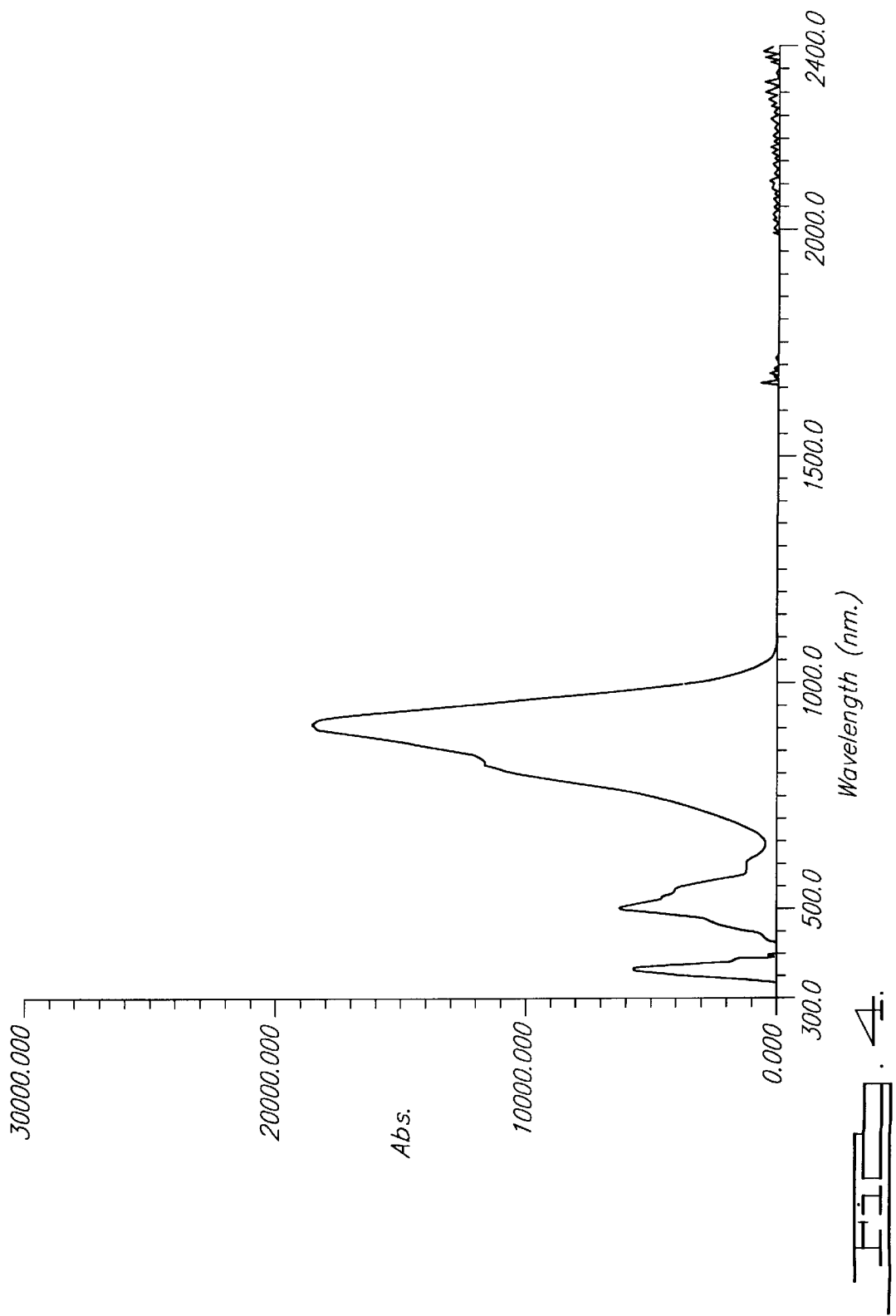
FIG. 4 shows a graph of the absorbance versus wavelength for the cation radical of [a]benzo-7-dimethylaminophenoxazine in propylene carbonate.

FIG. 4 shows a graph of the absorbance versus wavelength for the cation radical of [a]benzo-7-dimethylaminophenoxazine (compound VI) in propylene carbonate and shows the $\lambda_{max}$ for this cation radical to be at 912 nm (in the NIR portion of the electromagnetic spectrum). In addition, at 912 nm this compound has an $\epsilon$ of approximately 19,000 which makes this compound a good candidate for a NIR absorbing electrochromic compound.

As stated above, in conjunction with the $E_{SOMO}-E_{HDOMO}$ value, the predictor of NIR activity is whether the transition moment of the configuration made up of the HDOMO and SOMO is "long axis polarized." The intensity of an absorption band can be calculated using the "transition density." The transition density of a configuration is the outer product of the molecular orbitals involved in the configuration, i.e., the outer product of the SOMO and HDOMO wavefunctions. Thus the outer product or matrix product of two vectors $$\begin{bmatrix} 1 \\ 2 \end{bmatrix} \times [3\ 4]$$

would be the matrix $$\begin{bmatrix} 3 & 4 \\ 6 & 8 \end{bmatrix}$$

From the transition density, transition dipole moments can be determined. It is also possible to calculate the transition probabilities from state to state, i.e., the probability of the molecule going from the ground state to an excited state can be calculated. The transition dipole moment is calculated in a way that is similar to calculating the ground state dipole moment, by multiplying the transition density at an atomic center by the coordinate of the center. The intensity of an absorption band is related to the square of the transition dipole moment.

As stated above, we have found that the transition dipole moment that has a "long axis" primary component are compounds with strong absorbances. The compounds of the present invention fall into 2 broad categories. The first is the "5,10-dihydroanthracene type" which includes phenazine, phenoxazine, and phenothiazine as well as triphenodioxazine and triphenodithiazine compounds. These compounds have a short axis that runs from heteroatom to heteroatom in the ring system. For example, the nitrogen and oxygen would be heteroatoms in the substituted phenoxazine compound. The carbazole can be thought of in a similar way to the phenazine and phenoxazines. Also, the azines have their long axis perpendicular to the Y-axis. The second type is 1,4 disubstituted benzenes, which have their long axis running through the 1 and 4 positions of the benzene ring and the short axis from the midpoint of the 2–3 and to the midpoint of the 5–6 bond.

The structures of the compounds shown above are oriented so that their long axis is horizontal, i.e., parallel with the X-axis of the illustrated coordinate system. Table 2 lists the transition dipoles for the compounds and repeats the extinction coefficients from Table 1. It is seen that strong absorption bands are associated with larger x-components of the transition dipole. These long axis polarized transition dipoles are indicators of compounds that can be used as effective electrochromic materials. As can be seen from Table 2, compounds I, III, V–XXI and XXIII all have large x-components of their transition dipole, and they all have strong NIR absorbance. Compound IV, on the other hand, has a larger y-component of its transition dipole and does not have NIR activity. Compounds II and XXII, with their larger energy gap (greater than 3.6 eV) do not have NIR activity.

The use of orbital energy differences and transition density orientations to predict NIR active compounds is somewhat surprising since the possibility of repulsion due to largely localized orbitals is not taken into account. However, in view of the inventors discoveries, and armed with the knowledge of molecular orbital energies and transition dipole vectors, one can identify new materials with NIR activity, as well as revisit materials that may not have strong visible light (400–750 nm) absorption but could have NIR activity. The materials outlined in Tables 1 and 2 that exhibit NIR activity are not exhaustive and all compounds that meet the criteria outlined above should be understood to be a part of the present invention.

TABLE 2

| Cation Radical | Transition Dipole (Absolute Value) | | | |
| --- | --- | --- | --- | --- |
| of Compound | X | Y | Z | $\epsilon$ (from Table 1) |
| I | 3.87 | 0.49 | 0.27 | 46,000 |
| II | 3.17 | 0.006 | 0.0078 | 11,000 |
| III | 3.89 | 0.11 | 0.19 | 28,500 |
| IV | 0.0097 | 1.34 | 0.032 | 1,500 |
| V | 2.88 | 0.29 | 0.05 | 15,000 |
| VI | 3.77 | 0.56 | 0.27 | 19,000 |
| VII | 3.51 | 0.15 | 0.32 | 20,000 |
| VIII | 4.63 | 0.47 | 0.27 | 38,500 |
| IX | 3.11 | 0.67 | 0.44 | 21,000 at 750 nm |
| X | 3.72 | 0.53 | 0.55 | 47,000 |

TABLE 2-continued

| Cation Radical of Compound | Transition Dipole (Absolute Value) | | | |
|---|---|---|---|---|
| | X | Y | Z | ε (from Table 1) |
| XI | 3.80 | 0.06 | 0.22 | 14,000 |
| XII | 4.34 | 0.13 | 0.19 | 12,000 |
| XIII | 3.76 | 0.15 | 0.007 | 15,000 |
| XIV | 5.05 | 0.14 | 0.04 | |
| XV | 0.96 | 0.41 | 0.076 | |
| XVI | 3.34 | 0.47 | 0.16 | |
| XVII | 3.28 | 0.40 | 0.066 | |
| XVIII | 2.89 | 0.027 | 0.20 | |
| XIX | 3.55 | 0.38 | 0.22 | |
| XX | 3.09 | 0.049 | 0.010 | |
| XXI | 3.41 | 0.29 | 0.39 | |
| XXII | 3.15 | 1.49 | 3.93 | 10,000 |
| XXIII | 3.59 | 0.25 | 0.016 | 16,000 |
| XXIV | 1.76 | 0.006 | 0.0004 | |
| XXV | 1.26 | 0.07 | 0.0002 | |
| XXVI | 2.41 | 0.004 | 0.035 | |
| XXVII | 0.39 | 0.007 | 0.0007 | |
| XXVIII | 1.14 | 0.0067 | 0.0016 | |

Figure 5:
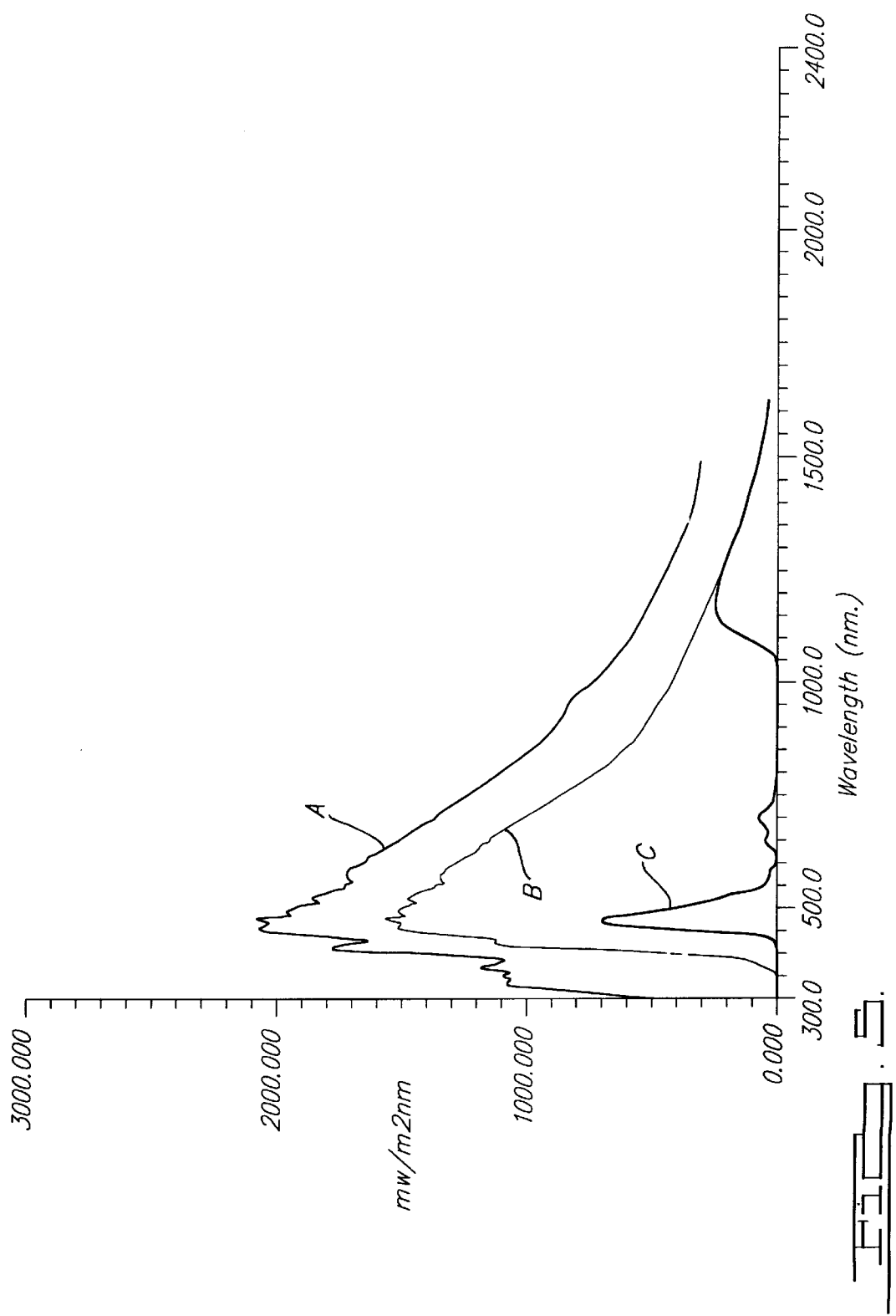
FIG. 5 shows a graph of the mW per square meter per nanometer versus wavelength for an electrochromic device containing tris(dimethylaminophenyl)amine combined with 1,1'-bis(3-phenyl(n-propyl))-4,4'-dipyridinium bis (tetrafluoroborate) and propylene carbonate.

In accordance with another aspect of the present invention, the above-described NIR active electrochromic compounds can be included as part of the electrochromic medium 124 into the electrochromic device 110 (see FIG. 1). FIG. 5 shows a graph of the mW per square meter per nanometer versus wavelength for the electrochromic device of Example 1 containing an electrochromic medium comprising tris(dimethylaminophenyl)-amine (compound I) combined with 1,1'-bis(3-phenyl(n-propyl))-4,4'-dipyridinium bis(tetrafluoroborate) and propylene carbonate. The tris(dimethylaminophenyl)-amine has a $E_{SOMO}-E_{HDOMO}$ of 3.05, an ε of 46,000 and the transition moment of the configuration made up of the HDOMO and SOMO is "long axis polarized." In FIG. 5, Curve A represents the absolute solar intensity (in mW per square meter per nanometer) at each wavelength, Curve B represents the amount of solar radiation that is transmitted through the electrochromic device in its clear (or zero applied potential) state. Curve C represents the amount of solar radiation that is transmitted through an electrochromic device in its activated colored or darkened state. Table 3 shows the percent transmission for the total solar region, the UV spectral region, the visible region and the NIR region for the same electrochromic device in its clear and darkened state. As can be seen from Table 3, this electrochromic device transmitted 55.6 percent of the total solar radiation, 5.8 percent of the UV radiation, 73.8 percent of the visible radiation and 46.2 percent of the NIR region in its clear state. In its darkened state the device transmitted 10.2 percent of the total solar radiation, 0.0 percent of the UV radiation, 8.4 percent of the visible radiation and 13.6 percent of the NIR radiation. Thus, this device attenuated the NIR portion of the electromagnetic spectrum by 70.6 percent and the total solar radiation by 81.7 percent.

TABLE 3

| Wavelength Range | Spectral Region | % Transmission In Clear State | % Transmission In Dark State |
|---|---|---|---|
| 300 to 400 | UV | 5.8 | 0.0 |
| 400 to 750 | Visible | 73.8 | 8.4 |
| 750 to 2400 | NIR | 46.2 | 13.6 |
| 300 to 2400 | Total Solar | 55.6 | 10.2 |

As a comparison, FIG. 6 shows a graph of the mW per square meter per nanometer versus wavelength for the electrochromic device of Example 2 containing compound IV (5,10-dimethyl-5,10-dihydrophenazine) combined with 1,1'-bis(3-phenyl(n-propyl))-4,4'-dipyridinium bis (tetrafluoroborate) and propylene carbonate. Compound IV has a $E_{SOMO}-E_{HDOMO}$ of 4.08, and an ε of 1,500 for the lowest energy absorption band, and the transition moment of the configuration made up of the HDOMO and SOMO is "short axis polarized." In FIG. 6, Curve A represents the absolute solar intensity (in mW per square meter per nanometer) at each wavelength, Curve B represents the amount of solar radiation that is transmitted through an electrochromic device in its clear (or zero applied potential) state. Curve C represents the amount of solar radiation that is transmitted through an electrochromic device in its dark state. Table 4 shows the percent transmission for the total solar region, the UV spectral region, the visible region and the NIR region for the same electrochromic device in its clear and darkened state. As can be seen from Table 4, this electrochromic device, in its clear state, transmitted 60.3 percent of the total solar radiation, 7.6 percent of the UV radiation, 74.5 percent of the visible radiation and 55.4 percent of the NIR region. In its darkened state the device transmitted 27.4 percent of the total solar radiation, 0.0 percent of the UV radiation, 8.9 percent of the visible radiation and 50.0 percent of the NIR radiation. Thus, this device attenuated the NIR portion of the electromagnetic spectrum by only 10 percent and the total solar radiation by 54.6 percent.

TABLE 4

| Wavelength Range | Spectral Region | % Transmission In Clear State | % Transmission In Dark State |
|---|---|---|---|
| 300 to 400 | UV | 7.6 | 0.0 |
| 400 to 750 | Visible | 74.5 | 8.9 |
| 750 to 2400 | NIR | 55.4 | 50.0 |
| 300 to 2400 | Total Solar | 60.3 | 27.4 |

Clearly, as the above comparison illustrates, a compound with a $E_{SOMO}-E_{HDOMO}$ of less than 3.6 and where the transition moment of the configuration made up of the HDOMO and SOMO is "long axis polarized" has significantly more NIR activity than a compound that does not have these characteristics. In addition, a compound that has a larger ε is also advantageous.

Table 5 shows the absorption data for the electrochromic device of Example 2 containing compound I (tris (dimethylaminophenyl) amine combined with 1,1'-bis(3-phenyl(n-propyl))-4,4'-dipyridinium bis(tetrafluoroborate) and propylene carbonate. In addition, the electrochromic medium contained about 8.5% of a crosslinked polymer matrix containing 1:10 isocyanatoethylmethacrylate to methylmethacrylate crosslinked with Bisphenol A. Compound I has an $E_{SOMO}-E_{HDOMO}$ of 3.05, and an E of 46,000 for the lowest energy absorption band, and the transition moment of the configuration made up of the HDOMO and SOMO is "long axis polarized".

TABLE 5

| Wavelength Range | Spectral Region | % Transmission In Clear State | % Transmission In Dark State |
|---|---|---|---|
| 300 to 400 | UV | 11.4 | 0.1 |
| 400 to 750 | Visible | 76.0 | 17.1 |
| 750 to 2400 | NIR | 46.3 | 15.2 |
| 300 to 2400 | Total Solar | 57.0 | 14.9 |

As can be seen from Table 5, this electrochromic device, in its clear state, transmitted 57 percent of the total solar radiation, 11.4 percent of the UV radiation, 76 percent of the visible radiation and 46.3 percent of the NIR region. In its darkened state, the device transmitted 14.9 of the total solar radiation, 0.1 percent of the UV radiation, 17.1 percent of the visible radiation and 15.2 percent of the NIR radiation.

In another of its embodiments, the present invention entails compounds of the general formula:

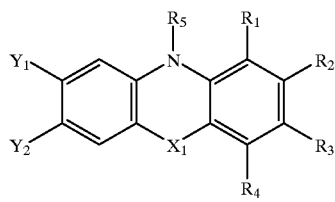

(XXIX)

where

R$_1$–R$_2$, R$_2$–R$_3$ or R$_3$–R$_4$ is benzo,

X$_1$ is NR$_6$, O, S or Se,

Y$_1$ is H, NR$_7$R$_8$, or OR$_9$

Y$_2$ is H, NR$_7$R$_8$ or OR$_9$, where at least one of Y, or Y$_2$ is NR$_7$R$_8$, and where R$_{5-9}$ may be independently chosen from the group consisting of alkyl, aryl or aralkyl having from 1 to 20 carbon atoms.

Compounds fitting the above general structure XXIX include compounds VI, XV, XVI, XVIII, XIX and XXI, although those skilled in the art will appreciate that using the teachings of the present invention, many more compounds having NIR activity may be prepared. All such compounds are intended to be a part of the present invention.

In yet another of its embodiments, the present invention entails compounds of the general formula:

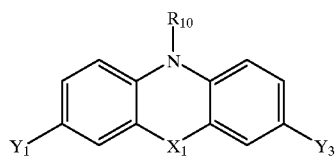

(XXX)

where

X$_1$ is NR$_2$, O, S or Se;

Y$_1$ is NR$_7$R$_8$ or OR$_9$;

Y$_3$ is NR$_7$R$_8$ and where R$_2$, and R$_7$–R$_{10}$ may be independently chosen from the group consisting of alkyl, aryl or aralkyl having from 1 to 20 carbons.

Compounds fitting the above general structure XXX include compounds III, V, and XI, although those skilled in the art will appreciate that using the teachings of the present invention, many more compounds having NIR activity may be prepared. All such compounds are intended to be a part of the present invention.

In yet another of its embodiments, the present invention entails compounds of the general formula:

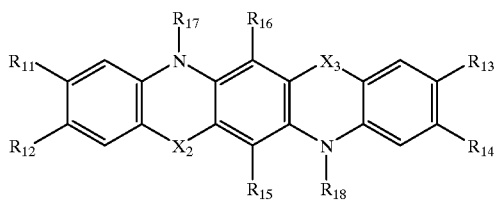

(XXXI)

where

X$_2$ and X$_3$ are independently selected from the group consisting of O, S and NR$_{19}$ R$_{11}$–R$_{14}$ are independently selected from the group consisting of CF$_3$, H, or alkyl having from 1 to 10 carbon atoms;

R$_{15}$ and R$_{16}$ are independently selected from the group consisting of H or OR$_{17}$; and R$_{17}$–R$_{19}$ are alkyl having from 1 to 10 carbon atoms.

Compounds fitting the above general structure include compounds VIII, X and XII, although those skilled in the art will appreciate that using the teachings of the present invention, many more compounds having NIR activity may be prepared. All such compounds are intended to be a part of the present invention.

In still another of its embodiments, the present invention entails compounds of the general formula:

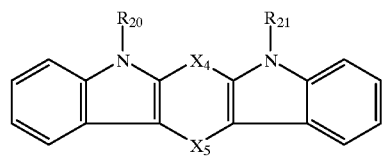

(XXXI)

where

X$_4$ is O, S, NR$_{22}$, or a single bond,

X$_5$ is O, S, or a single bond, where at least one of X$_4$ or X$_5$ is a single bond, and R$_{20}$–R$_{22}$ may be independently chosen from the group consisting of alkyl, aryl or aralkyl having from 1 to 20 carbons.

Compounds fitting the above general structure include compounds XXIV through XXVIII, although those skilled in the art will appreciate that using the teachings of the present invention, other compounds having NIR activity may be prepared, and that all such compounds are intended to be a part of the present invention.

Compositions of the invention, which are media of reversibly variable transmittance in electrochromic devices, may also comprise an inert, current carrying electrolyte, particularly if there is no electrochromic compound which is ionic in its equilibrium state in an electrochromic device with no potential difference between the cathode and anode. Such inert, current-carrying electrolytes are well known in the art. Examples are provided in U.S. Pat. No. 4,902,108.

Compositions of the invention, which are media of reversibly variable transmittance in electrochromic devices, may also include a polymeric thickener. In this regard, reference is also made to U.S. Pat. No. 4,902,108, and U.S. patent application Ser. No. 08/834,783 now U.S. Pat. No. 5,940,201, entitled "An Electrochromic Mirror with Two Thin Glass Elements and a Gelled Electrochromic Medium." While many such thickeners are known, polyethylene oxide and "PMMA" (polymethylmethacrylate), and certain PMMA copolymers disclosed in U.S. patent application Ser. No. 08/834,783 now U.S. Pat. No. 5,940,201 are preferred.

Electrochromic devices, which comprise as the medium of reversibly variable transmittance a composition according to the invention, are also encompassed by the present invention. Preferred among these are solution-phase, single-compartment, self-erasing devices, although those skilled in the art will appreciate that hybrid electrochromic devices may be used. These hybrid electrochromic devices comprise a solution-phase electrochromic compound in combination with either a surface confined electrochromic layer or an electrodeposition-type electrochromic material.

Thus, in another of its embodiments, the invention entails, in a single-compartment, self-erasing, solution-phase electrochromic device which comprises, as the medium of reversibly variable transmittance to light, an aprotic polar solvent, and at least one electrochromic compound of the present invention that absorbs in the NIR portion of the electromagnetic spectrum. Preferably, the electrochromic device comprises, as the medium of reversibly variable transmittance to light at least one anodic electrochromic compound and at least one cathodic electrochromic compound, where at least one of the electrochromic materials absorbs in the NIR portion of the electromagnetic spectrum. The devices of the invention can be employed as the variable transmittance components of variable transmission light filters, such as windows, or variable reflectance mirrors, including anti-glare, outside and inside, rearview mirrors for motor vehicles. Construction of single-compartment, self-erasing, solution-phase electrochromic devices according to the invention are described in U.S. Pat. No. 4,902,108.

The electrochromic medium optionally comprises the electrochromic materials, and other materials like solvents, light absorbers, light stabilizers, UV stabilizers, thermal stabilizers, antioxidants, tint-providing compounds, and a freestanding gel.

The NIR absorbing compounds of the present invention will be advantageously used in windows (typically large area windows) where heat transfer from the outside of the building to the inside of the building is important. Large area devices that have a solution as some part of the electrochromic medium suffer from hydrostatic pressure. To help alleviate this problem a freestanding gel (which includes a polymer matrix) may be incorporated as part of the electrochromic medium.

The polymer matrix that may optionally be used is disclosed in either U.S. Pat. No. 5,679,283 or in commonly assigned co-pending U.S. patent application Ser. No. 08/616,967 now U.S. Pat. No. 5,928572, entitled "IMPROVED ELECTROCHROMIC LAYER AND DEVICES COMPRISING SAME" to W. L. Tonar et al. For electrochromic windows (especially larger windows), the polymer matrix cooperatively interacts with glass elements 112 and 114 such that the hydrostatic pressure that typically occurs from gravity acting on the electrochromic medium (when the electrochromic medium includes a solution) is reduced or eliminated.

The polymer matrix may comprise at least one polymer based on the vinyl polymerization of a molecule having the general formula:

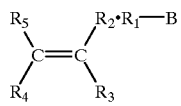

where $R_1$ is optional and may be selected from the group consisting of: alkyl, cycloalkyl, poly-cycloalkyl, heterocycloalkyl, carboxyl and alkyl and alkenyl derivatives thereof; alkenyl, cycloalkenyl, cycloalkadienyl, poly-cycloalkadienyl, aryl and alkyl and alkenyl derivatives thereof, hydroxyalkyl; hydroxyalkenyl; alkoxyalkyl; and alkoxyalkenyl where each of the compounds has from 1 to 20 carbon atoms. $R_2$ is optional and may be selected from the group consisting of alkyl, cycloalkyl, alkoxyalkyl, carboxyl, phenyl and keto where each of the compounds has from 1–8 carbon atoms, and oxygen. $R_3$, $R_4$, and $R_5$ may be the same or different and may be selected from the group consisting of: hydrogen, alkyl, cycloalkyl, poly-cycloalkyl, heterocycloalkyl, and alkyl and alkenyl derivatives thereof; alkenyl, cycloalkenyl, cycloalkadienyl, poly-cycloalkadienyl, aryl and alkyl and alkenyl derivatives thereof; hydroxyalkyl; hydroxyalkenyl; alkoxyalkyl; alkoxyalkenyl; keto; acetoacetyl; vinyl ether and combinations thereof, where each of the compounds has from 1 to 8 carbon atoms. Finally, B may be selected from the group consisting of hydroxyl; cyanato; isocyanato; isothiocyanato; epoxide; silanes; ketenes; acetoacetyl, keto, carboxylate, imino, amine, aldehyde and vinyl ether. However, as will be understood by those skilled in the art, if B is an cyanato, isocyanato, isothiocyanato, or aldehyde it is generally preferred that $R_1$, $R_2$, $R_3$, $R_4$, and $R_5$ not have a hydroxyl functionality.

Preferred among the monomers is methyl methacrylate; methyl acrylate; isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate; 4-vinylphenol; acetoacetoxy methacrylate and acetoacetoxy acrylate.

The monomers should also preferably be capable of pre-polymerization. By pre-polymerization we mean that the monomers and/or precursors react with one another to produce relatively long and relatively linear polymers. This pre-polymerization is substantially free of any crosslinking reactions, and is generally accomplished as follows. A certain amount of the monomer(s) is dissolved in a suitable solvent; the solution may be optionally purged with an inert gas such as nitrogen, argon or helium, and at least one electrochromic species may optionally be added. The polymerization reaction is initiated by known techniques, e.g., heat, photo and/or chemical initiator such as azo or peroxide initiators, and long and primarily linear chains of the polymer are built through a simple addition reaction.

It should be understood that more than one monomer might be pre-polymerized together. Equation [1] shows the general formula for the monomers, and any of the combinations of the monomers shown may be combined into one or more polymers (i.e., a polymer, a copolymer, terpolymer, etc.) in the pre-polymerization process. For example, one monomer may be polymerized to give a homogeneous polymer material such as poly(2-hydroxyethyl methacrylate), poly(2-isocyanatoethyl methacrylate), and the like. However, it is generally preferred that a species with a crosslinking reactive component (e.g., hydroxyl, acetoacetyl, isocyanate, thiol etc.) be combined with another species either having the same crosslinking reactive component or no crosslinking reactive component (e.g., methyl methacrylate, methyl acrylate, etc.). If a copolymer is produced, the ratio of the monomers without and with the crosslinking components may range from about 200:1 to about 1:200. Although the following description relates to copolymers, it will be understood by those skilled in the art that more complex structures (terpolymers, etc.) may be made using the same teachings.

For example, 2-isocyanatoethyl methacrylate (IEMA) may be combined with MMA in the ratio of about 1:3 to about 1:50 with the preferred ratio of about 1:20. Crosslinking of a group containing an isocyanate can occur with any compound containing a reactive hydrogen, such as hydroxyl, thiol, acetoacetyl, urea, melamine, urethanes, with hydroxyl being presently preferred. These should have a functionality greater than one and may be the same as those described hereinabove, aliphatic or aromatic compounds or, preferably, may be 1,3-hydroxy benzene.

Further, two copolymers may be combined such that they crosslink with one another. For example 2-hydroxyethyl methacrylate (HEMA)/MMA may be combined with IEMA/MMA and the hydroxyl groups of HEMA will self-react with the isocyanate groups of IEMA to form an open polymeric structure. It should be understood that the rates of crosslinking for any of the polymers described herein could be controlled by proper selection of the reactive crosslinking species employed. For example, using an aromatic isocyanate or an aromatic alcohol or both can increase reaction rates. Reaction rates can be decreased, for example, by using sterically hindered isocyanates or sterically hindered alcohols or both.

An improved UV stabilizer is described and claimed in co-pending U.S. patent application Ser. No. 08/906,750 now U.S. Pat. No. 5,770,114, entitled "UV-STABILIZED COMPOSITIONS WITH IMPROVED SOLUBILITY", filed on or about Aug. 6, 1997. The compounds described in this Application have increased solubility in aprotic polar solvents used in electrochromic devices and are much more effective in stabilizing compositions, which comprise at least one electrochromic compound and are useful as media of variable transmittance in electrochromic devices, against degradation due to exposure to UV-radiation than prior UV stabilizers.

Components of the solutions of electrochromic compounds described herein, absorb UV photons and, as a consequence, may undergo degradative reactions upon exposure to UV light. Thus, windows and rearview mirrors, wherein such solutions are employed to provide variable transmittance or reflectance, have useful lifetimes significantly limited in environments, such as on the exterior and certain places on the interior of buildings, or on the exterior and certain places on the interior of automobiles, where they are exposed for extended periods of time to ultraviolet light, as from the sun.

There has existed a need, then, to stabilize materials, which comprise UV-radiation-absorbing compounds, against degradation caused by exposure to UV-light. Many ultraviolet absorbers or stabilizer agents, that are compounds that provide such stabilization, when combined with materials susceptible to UV-degradation, are known in the art. Ultraviolet absorbers or stabilizer agents absorb ultraviolet radiation competitively with other compounds in a stabilized composition or are capable, without decomposition of the stabilizer itself, of dissipating the energy acquired upon absorption of a UV-photon by the materials being stabilized. Such agents must also satisfy a number of other requirements, depending on properties of the compositions to be stabilized. For example, the agents must be sufficiently soluble in such a composition and must not interact with other components in the composition in a way that interferes with using the composition for its intended purpose. Thus, an ultraviolet stabilizer agent for use in a solution employed as a medium of variable transmittance to visible light in an electrochromic device must not interact with the electrochromic compounds or other components of the medium in a way such that they cease to function effectively in the medium and it must not compete with the electrochromic compounds for oxidation or reduction at the electrodes of an electrochromic device.

Among ultraviolet stabilizer agents, known to stabilize plastics, are the compound ethyl-2-cyano-3,3-diphenyl acrylate, sold by BASF (Parsippany, NJ) under the trademark Uvinul N-35 and by Aceto Corporation (Flushing, N.Y., USA) under the trademark Viosorb 910; the compound (2-ethylhexyl)-2-cyano-3,3-diphenyl acrylate, sold by BASF under the trademark Uvinul N-539; the compound 2-(2'-hydroxy-4'-methylphenyl)benzotriazole, sold by Ciba-Geigy Corp. under the trademark Tinuvin P; the compound 2-hydroxy-4-methoxybenzophenone, sold by American Cyanamid under the trademark Cyasorb UV 9; and the compound 2-ethyl-2'-ethoxyoxalanilide, sold by Sandoz Color & Chemicals under the trademark Sanduvor VSU.

Referring again to FIG. 1, during operation of an electrochromic window or device in the clear state, light rays enter through the front glass 112 and pass through the transparent conductive layer 116 the electrochromic medium in chamber 122, and finally the back glass 114 of the window 110. When a sufficiently high voltage is applied to an electrochromic device, electrochemical reduction takes place by electron transfer to the electrochromic medium from one of the electrodes (designated as the cathode) and electrochemical oxidation takes place by electron transfer from the electrochromic medium to the other electrode (designated as the anode). The electrochemical reduction and/or the electrochemical oxidation give rise to a change in the light absorption properties of the material or materials reduced and/or oxidized. This change in light absorption can be a combination of both the anodic and cathodic electrochromic compounds and changes the absorption characteristics of the UV, visible and NIR portions of the electromagnetic spectrum attenuated in proportion to the degree to which the electrochromic medium 124 is light absorbing. Thus, operation, or activation, of the device generally results in an increase in light absorption at the wavelengths of interest (e.g., visible and NIR) although it is possible for operation of an already colored device to result in a decrease in light absorption at the wavelengths of interest.

Figure 7:
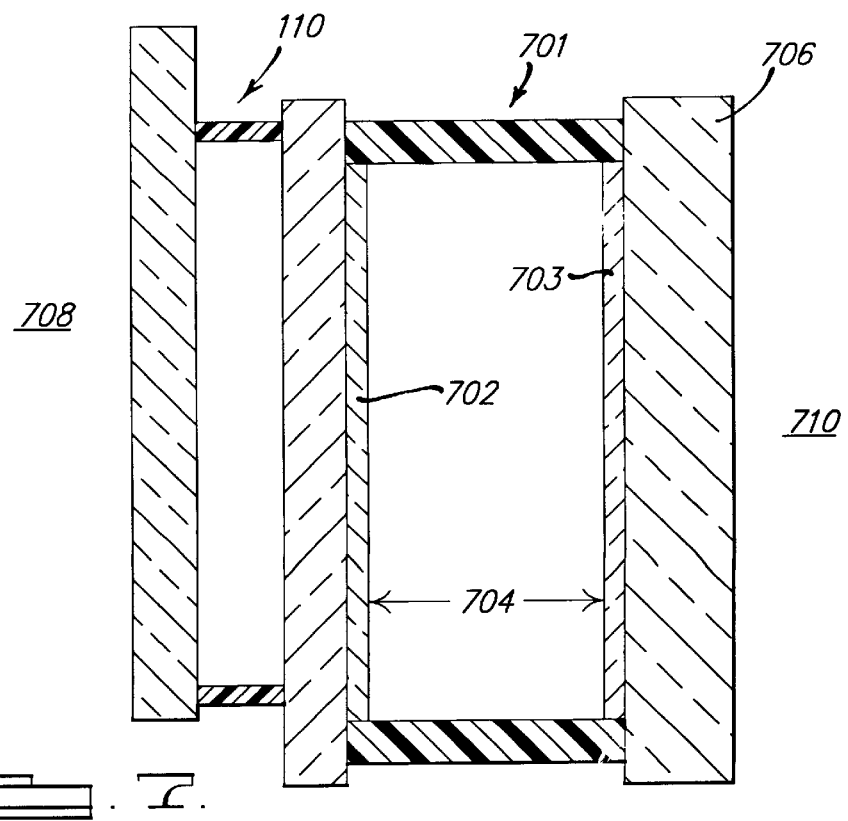
FIG. 7 is an enlarged cross-sectional view of an electrochromic device of the present invention combined with an insulated glass unit.

Another embodiment of the present invention is shown in FIG. 7. This embodiment takes advantage of the fact that a substantial amount of the solar energy is absorbed by devices of the invention and that, by combining these devices with one or more coatings that have high infrared reflection and low infrared emission, a device is provided having exceptional solar energy barrier properties when activated. The advantages of the combination of the one or more coatings, which each have high infrared reflection and low infrared emission and are normally referred to as Low-E coatings, with the strong solar absorption of the electrochromic media of the present invention, are preferably achieved as shown in FIG. 7. An insulated glass unit 701 may be combined with an electrochromic device 110. Coatings 702 and 703 are Low-E coatings, such as fluorine-doped tin oxide, indium-doped tin oxide, a multi-layer coating of zinc oxide, silver and zinc oxide or the like.

Depending on the desired result, either coating 702 or coating 703 or both may be included. When the electrochromic device 110 is activated and thus absorbing solar energy, a layer of a Low-E coating 702 by itself can serve to minimize energy transfer across the gap 704, (where 704 is a space filled with dry air or an inert gas with a spacing set to minimize energy transfer by convection), to element 706 and thus to the interior 710 of the building or other structure. Alternatively coating 703 by itself will reflect radiation from the electrochromic device 110 back to device 110 so the energy can be radiated to the surroundings on the outdoor side 708 of device 110. If both 702 and 703 are included, radiant energy from 110 is blocked from entering the indoors by both the low infrared emission from 702 and the high infrared reflection of 703 thus inhibiting the black body radiation of electrochromic device 110, (warmed by solar energy absorption), from being absorbed by 706 and then being re-radiated to the interior 710 of the building or other structure.

The Low-E coating(s) used should be good at reflecting and poor at radiating the longer wavelength infrared radiation radiated from a warm electrochromic device and should still pass the shorter wavelength radiation contained in sunlight. This allows the window or device structure in FIG. 7 to pass visible and NIR solar energy on cold days or in the winter when the device is not activated and be a high efficiency energy barrier when the device is activated.

The following illustrative examples are not intended to limit the scope of this invention but to illustrate its application and use:

EXAMPLE 1

Two stock solutions, one containing 28 mM tris(4-dimethylaminophenylamine) in propylene carbonate and the other containing 34 mM bis(3-phenylpropyl)-4,4'-dipyridinium) bis(tetrafluoroborate) in propylene carbonate were prepared in separate small vials. Both stock solutions were deoxygenated with dry nitrogen. Equal volumes of each stock solution were introduced into a clean vial. This mixture was then used to fill electrochromic devices.

Electrochromic window devices were fabricated as is known in the art with TEC-15 glass from Libbey-Owens-Ford with a 137-micrometer cell spacing. The devices were about 1'×2" in area and were filled by introducing the solution described above into the device through one of two holes drilled in the top plate. Both holes were then plugged using a hot melt adhesive.

The transmission spectrum was measured in the range of 300–2400 nm and the % T at 0.0 V and 1.2 V were multiplied by the solar contribution at each wavelength resulting in the % total solar transmission of 56.0% at 0.0 V and 16.2% at 1.2 V.

EXAMPLE 2

A window similar to Example 1, except the solution contained 28 mM 5,10-dihydro-5,10-dimethylphenazine and 34 mM bis(3-phenyl(n-propyl))-4,4'-dipyridinium) bis (tetrafluoroborate) in propylene carbonate. The total solar transmission for this window was 59.7% at 0.0 V and 26–28% at 1.2 V.

EXAMPLE 3

Window similar to Example 1, except the solution contained 10 mM bis(3-phenyl(n-propyl))-4,4'-dipyridinium) bis(tetrafluoroborate) saturated with N,N,N',N'-tetraanisyl-1,4-phenylenediamine in propylene carbonate. This spectrum was then normalized to 30 mM in both the anodic and cathodic material in a device, giving a total solar % transmission of about 52% at 0.0 V and about 4% at 1.2 V.

EXAMPLE 4

Window similar to Example 1, except the solution contained 10 mM bis(3-phenyl(n-propyl))-4,4'-dipyridinium) bis(tetrafluoroborate) saturated at room temperature with 3-dimethylamino-7-methoxy-10-methylphenathiazine. This spectrum was then normalized to 30 mM in both the anodic and cathodic material in a device, giving a total solar % transmission of about 56% at 0.0 V and about 12% at 1.2 V.

EXAMPLE 5

Window similar to Example 1, except the solution contained 10 mM bis(3-phenyl(n-propyl))-4,4'-dipyridinium) bis(tetrafluoroborate) and 10 mM [a]-benzo-7-dimethylaminophenoxazine in propylene carbonate. This spectrum was then normalized to 30 mM in both the anodic and cathodic material in a device, giving a total solar % transmission of about 56% at 0.0 V and about 17% at 1.2 V.

EXAMPLE 6

Window similar to Example 1, except the solution contained 10 mM bis(3-phenyl(n-propyl))-4,4'-dipyridinium) bis(tetrafluoroborate) saturated with N,N-dipropyltriphenodioxazine. This spectrum was then normalized to 30 mM in both the anodic and cathodic material in a device, giving a total solar % transmission of about 52% at 0.0 V and about 14% at 1.2 V.

EXAMPLE 7

[a]benzo-7,N,N-dimethylamino-10-methylphenoxazine (compound VI) was formed in a 2-step process.

In the first step, 6.2 g of Meldola's Blue dye was reduced to its "leuco" form by dissolving it in 50 ml of water and adding to it an aqueous solution containing 17.4 g of sodium dithionite ($Na_2S_2O_4$). From the blue solution precipitated a tan-colored solid, which is the leuco form of the dye. This solid was filtered off and dried under vacuum.

In the second step, the reduced dye was dissolved in 100 ml of dry tetrahydrofuran and to it was added 3 equivalents of phenyl lithium. The lithio derivative that formed precipitated out of the tetrahydrofuran solution. After ½ hour, 2 equivalents of iodomethane were added and the reaction allowed to stir at room temperature for four hours. The THF reaction solution was passed over a silica gel column to isolate the methylated product. It was recrystallized from ethanol to yield 0.4 grams of a light yellow granular solid. The compound was characterized by mass spectral analysis.

EXAMPLE 8

3-methoxy-7-N,N-dimethylamino-10-methylphenothiazine (Compound V) was produced from a 2-step process.

In the first step, methylene violet was reduced to its leuco form by dissolving it in methanol then adding 10% Pd/C as catalyst and finally hydrazine as a reducing agent. After one hour of stirring at room temperature, the "leuco" or reduced form of methylene violet precipitated out of solution and was filtered off. This intermediate product was then dried under vacuum.

In the second step, this dried leuco intermediate was added to a deoxygenated solution of DMSO containing an excess of dissolved potassium hydroxide. This mixture was stirred for ½ hour to allow for formation of the potassium salt, after which was added two equivalents of iodomethane. The reaction mixture was stirred for 6 hours at room temperature, after which water and ethyl acetate were added to it. The resulting mixture was stirred and after settling the lower layer was discarded. The water wash was repeated two more times, then the ethyl acetate layer was concentrated and re-dissolved in toluene. Product was isolated from this solution using silica gel column chromatography to purify. Fractions containing product were concentrated during which the white crystalline product precipitated. The compound was characterized by mass spectral analysis.

EXAMPLE 9

Bis-3,7-N,N-dimethylamino-10-methylphenothiazine (Compound III) was prepared in a 2-step synthesis.

In the first step, the starting material, methylene blue, was reduced to its "leuco" form by dissolving in water and adding to it 2 equivalents of sodium dithionite ($Na_2S_2O_4$) in an aqueous solution. The leuco form of methylene blue precipitated out of the aqueous solution as a tan solid and was isolated with vacuum filtration.

In the next step, 1 equivalent of potassium hydroxide was added to deoxygenated dimethylsulfoxide and was stirred for 15 minutes. The filter cake, from above, was added to the DMSO reaction slurry and was stirred for ½ hour to allow for the potassium salt formation of the phenothiazine. To this solution was added 1.5 equivalents of iodomethane and the reaction mixture was stirred for four hours at room temperature. Water and ethyl acetate were added to the DMSO reaction solution and the mixture was stirred to extract product into the ethyl acetate layer. The water layer was discarded. The ethyl acetate layer, containing methylated product, was concentrated then dissolved in acetone. The acetone solution was loaded to a silica gel column, from which the white crystalline product was isolated. The compound was characterized by mass spectral analysis.

EXAMPLE 10

7,14-dipropyltriphenodioxazine (Compound X) was prepared as follows:

Triphenodioxazine (24.4 mM) was added to a stirred suspension of potassium (100 mg) in dry 1,2-dimethoxyethane (150 ml) under an argon atmosphere at room temperature. The resulting red/brown-colored mixture was warmed to approximately 60 degrees Celsius and was kept stirred at this temperature for 41 hours. After this period, the mixture was cooled to room temperature and the triphenodioxazine dianion was quenched with 1-iodopropane (0.08 mol). After brief stirring, the unreacted metal was destroyed with a few milliliters of absolute ethanol and the reaction mixture was evaporated to dryness to leave behind a dark colored crude material. Silica gel chromatography of the crude material with a hexane, ethyl acetate, and methanol mixture as the eluting solvent yielded the desired product in low yield. Recrystallization of the product from absolute methanol yielded a straw-yellow solid (m.p. 159–160 degrees Celsius). The compound was characterized by mass spectral analysis.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed:

1. An electrochromic medium comprising at least one solution-phase anodic compound, where an oxidized form of said anodic compound has a $E_{SOMO}-E_{HDOMO}$ of less than 3.6 eV, a redox potential greater than about 90 mV, and an absorption band having a $\lambda_{max}$ greater than approximately 750 nm, excluding therefrom the compounds of the formula:

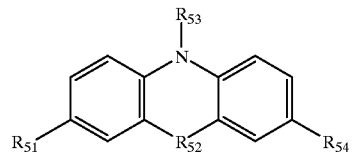

wherein $R_{51}$ and $R_{54}$ are the same or different and are each selected from hydrogen and dialkylamino, wherein the alkyl groups are the same or different and are each of 1 to 6 carbon atoms, $R_{52}$ is oxygen, sulfur or $NR_{55}$, wherein $R_{55}$ is the same as or different from $R_{53}$ and both $R_{55}$ and $R_{53}$ are selected from hydrogen, alkyl of 1 to 10 carbon atoms, phenyl optionally substituted at any one position with chloride, bromide, iodide, cyano, or alkyl of 1 to 4 carbon atoms, or benzyl, optionally substituted at any one position of the phenyl group with chloride, bromide, iodide, cyano, or alkyl of 1 to 4 carbon atoms.

2. The medium of claim 1, wherein said oxidized form of said anodic compound is capable of absorbing in the NIR portion of the electromagnetic spectrum.

3. The medium of claim 1, wherein said medium is self-erasing.

4. The medium of claim 1, wherein said medium is solution-phase.

5. The medium of claim 1, wherein the outer product of the SOMO and HDOMO of said anodic compound results in a long axis transition dipole moment.

6. The medium of claim 5, wherein said oxidized form of said anodic compound is capable of absorbing in the NIR portion of the electromagnetic spectrum and where said electrochromic medium further comprises a solvent and a cathodic electrochromic material.

7. The medium of claim 6, wherein said medium is self-erasing.

8. The medium of claim 6, wherein said medium is solution-phase.

9. The medium of claim 6, wherein said anodic electrochromic compound is selected from the group consisting of:

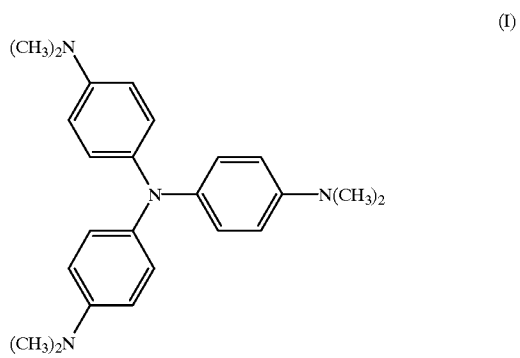

(V)
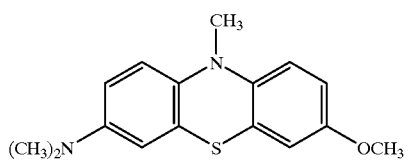

(VI)
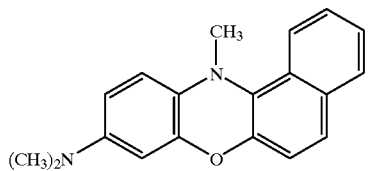

(VII)
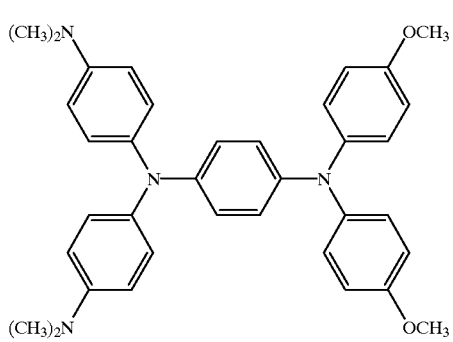

(VIII)
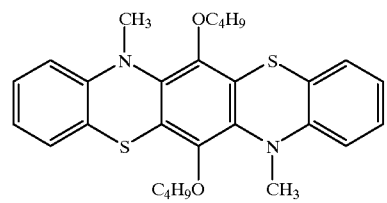

(X)
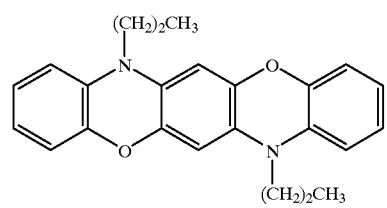

(XIII)
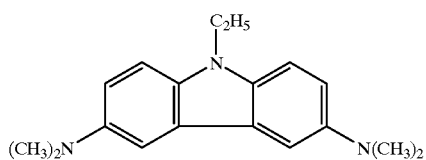

(XIV)
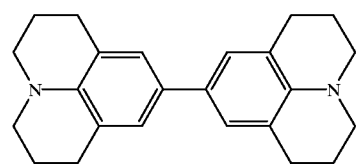

(XXIII)

10. An electrochromic device, which comprises, as the medium of reversibly variable transmittance to light, the electrochromic medium of claim 1.

11. An electrochromic device, which comprises, as the medium of reversibly variable transmittance to light, the electrochromic medium of claim 5.

12. The device of claim 11, wherein said electrochromic medium is held in a space defined by two planar, parallel, spaced-apart walls, and a periphery defined by a seal, where the side of each of said walls that is in contact with said medium is coated with a layer of electrically conductive material.

13. An electrochromic medium comprising at least one solution-phase anodic compound, where an oxidized form of said anodic compound has an $E_{SOMO}-E_{HDOMO}$ of less than 3.6 eV, and an absorption band having a $\lambda_{max}$ greater than approximately 750 nm, excluding therefrom the compounds of the formula:

(LII)
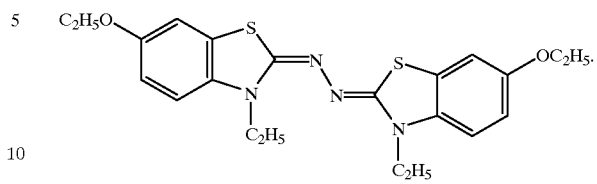

wherein $R_{76}$ is oxygen or sulfur, $R_{80}$ is hydrogen or dialkylamino, wherein the alkyl groups are the same or different and are each of 1 to 6 carbon atoms, and $R_{77}$ and $R_{78}$ are the same or different and are each selected from hydrogen, alkyl of 1 to 6 carbon atoms, phenyl optionally substituted at any one position with an alkyl group of 1 to 6 carbon atoms, and benzyl, optionally substituted at any one position of the phenyl group with an alkyl group of 1 to 6 carbon atoms, and excluding therefrom the compounds of the formula:

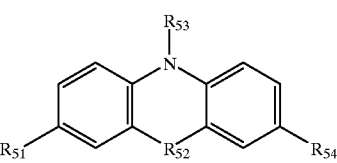

wherein $R_{51}$ and $R_{54}$ are the same or different and are each selected from hydrogen and dialkylamino, wherein the alkyl groups are the same or different and are each of 1 to 6 carbon atoms; $R_{52}$ is oxygen, sulfur or $NR_{55}$, wherein $R_{55}$ is the same as or different from $R_{53}$ and both $R_{55}$ and $R_{53}$ are selected from hydrogen, alkyl of 1 to 10 carbon atoms, phenyl optionally substituted at any one position with chloride, bromide, iodide, cyano, or alkyl of 1 to 4 carbon atoms, or benzyl, optionally substituted at any one position of the phenyl group with chloride, bromide, iodide, cyano, or alkyl of 1 to 4 carbon atoms.

14. The medium of claim 13, wherein said oxidized form of said anodic compound is capable of absorbing in the NIR portion of the electromagnetic spectrum.

15. The medium of claim 14, wherein said medium is self-erasing.

16. The medium of claim 15, wherein said medium is solution-phase.

17. The medium of claim 13, wherein the outer product of the SOMO and HDOMO of said anodic compound results in a long axis transition dipole moment.

18. The medium of claim 17, wherein, said oxidized form of said anodic compound is capable of absorbing in the NIR portion of the electromagnetic spectrum and where said electrochromic medium further comprises a solvent and a cathodic electrochromic material.

19. The medium of claim 18, wherein said medium is self-erasing.

20. The medium of claim 18, wherein said medium is solution-phase.

21. The medium of claim 18, wherein said anodic electrochromic compound is selected from the group consisting of:

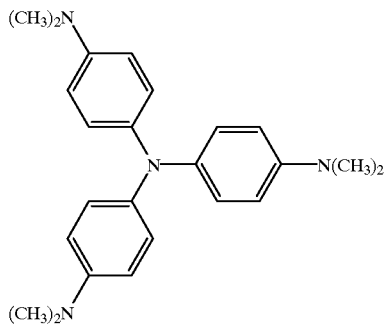
(I)

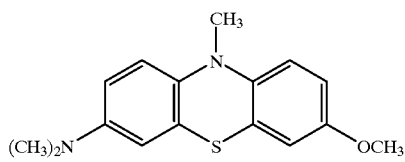
(V)

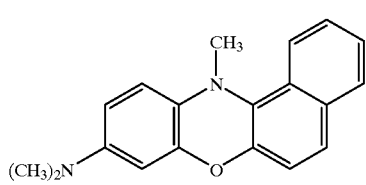
(VI)

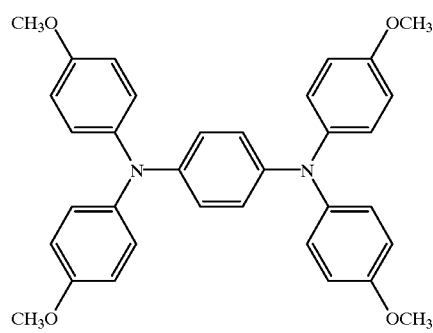
(VII)

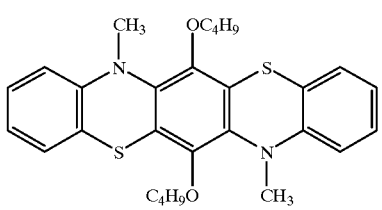
(VIII)

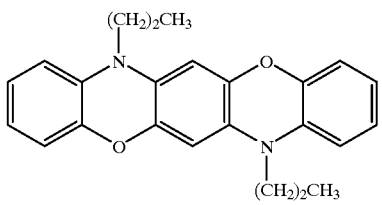
(X)

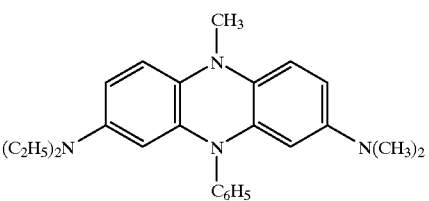
(XI)

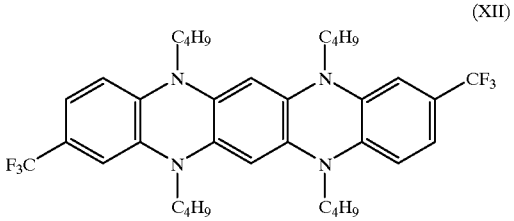
(XII)

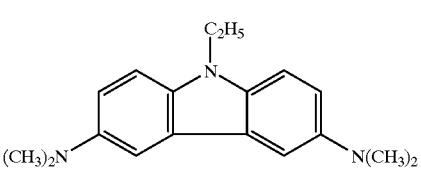
(XIII)

-continued (XIV)
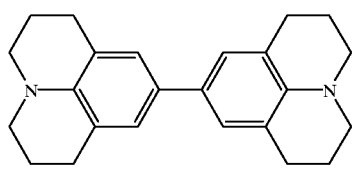

(XV)
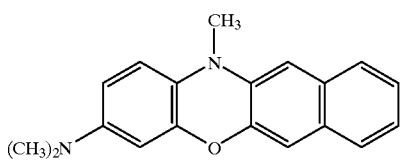

(XVI)
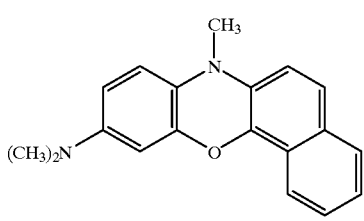

(XVII)
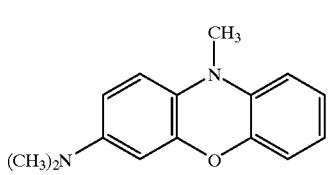

(XVIII)
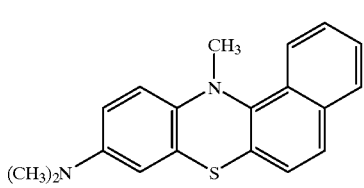

(XIX)
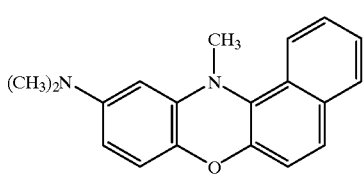

(XX)
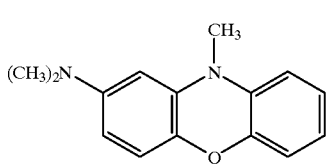

(XXI)
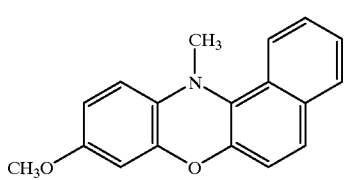

-continued (XXIII)
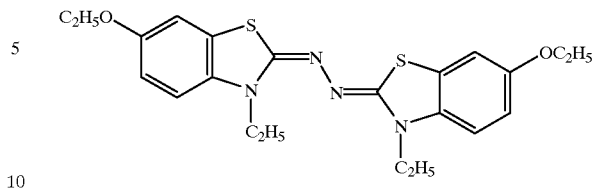

(XXIV)
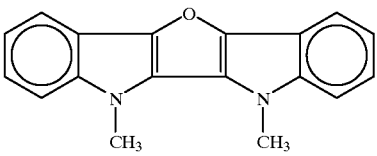

(XXV)
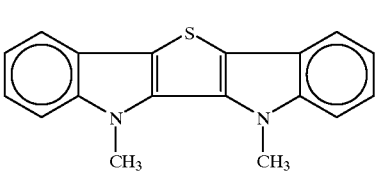

(XXVI)
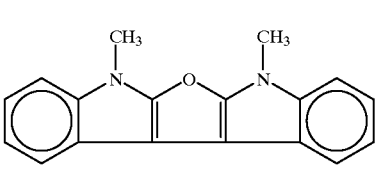

(XXVII)
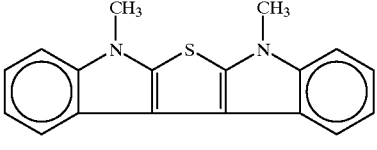

(XXVIII)
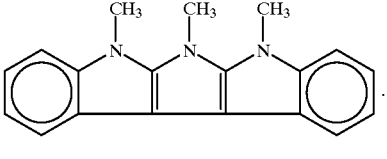

22. An electrochromic device, which comprises, as the medium of reversibly variable transmittance to light, the electrochromic medium of claim 15.

23. An electrochromic device, which comprises, as the medium of reversibly variable transmittance to light, the electrochromic medium of claim 18.

24. The device of claim 23, wherein said electrochromic medium is held in a space defined by two planar, parallel, spaced-apart walls, and a periphery defined by a seal, where the side of each of said walls that is in contact with said medium is coated with a layer of electrically conductive material.

25. An electrochromic medium comprising a crosslinked polymer matrix and at least one anodic compound, where an oxidized form of said anodic compound has a redox potential greater than about 90 mV, and an absorption band having a $\lambda_{max}$ greater than approximately 750 nm, excluding therefrom the compounds of the formula:

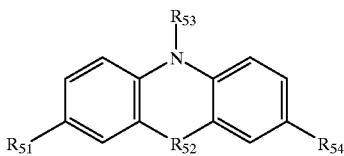

wherein $R_{51}$ and $R_{54}$ are the same or different and are each selected from hydrogen and dialkylamino, wherein the alkyl groups are the same or different and are each of 1 to 6 carbon atoms; $R_{52}$ is oxygen, sulfur or $NR_{55}$, wherein $R_{55}$ is the same as or different from $R_{53}$ and both $R_{55}$ and $R_{53}$ are selected from hydrogen, alkyl of 1 to 10 carbon atoms, phenyl optionally substituted at any one position with chloride, bromide, iodide, cyano, or alkyl of 1 to 4 carbon atoms, or benzyl, optionally substituted at any one position of the phenyl group with chloride, bromide, iodide, cyano, or alkyl of 1 to 4 carbon atoms.

26. The medium of claim 25, wherein said oxidized form of said anodic compound is capable of absorbing in the NIR portion of the electromagnetic spectrum.

27. The medium of claim 25, wherein said medium further comprises a solvent and where said anodic compound is in solution in said solvent and interspersed in said polymer matrix.

28. The medium of claim 27, wherein said medium is self-erasing.

29. The medium of claim 25, wherein the outer product of the SOMO and HDOMO of said anodic compound results in a long axis transition dipole moment.

30. The medium of claim 29, wherein, said oxidized form of said anodic compound is capable of absorbing in the NIR portion of the electromagnetic spectrum and where said electrochromic medium further comprises a solvent and a cathodic electrochromic material.

31. The medium of claim 30, wherein said anodic compound is in solution in said solvent and interspersed in said polymer matrix.

32. The medium of claim 30, wherein said medium is solution-phase.

33. An electrochromic device, which comprises, as the medium of reversibly variable transmittance to light, the electrochromic medium of claim 30.

34. An electrochromic device, which comprises, as the medium of reversibly variable transmittance to light, the electrochromic medium of claim 31.

35. The device of claim 34, wherein said electrochromic medium is held in a space defined by two planar, parallel, spaced-apart walls, and a periphery defined by a seal, where the side of each of said walls that is in contact with said medium is coated with an electrode layer of electrically conductive material, and where said polymer matrix comprises less than about fifty percent by weight of said electrochromic medium.

36. An electrochromic window comprising an electrochromic medium, said electrochromic medium comprising a crosslinked polymer matrix and an anodic compound, wherein said window is capable of absorbing in the NIR portion of the electromagnetic spectrum, and said anodic compound has a redox potential greater than about 90 mV, and an absorption band having a $\lambda_{max}$ greater than approximately 750 nm, excluding therefrom the compounds of the formula:

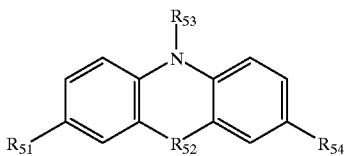

wherein $R_{51}$ and $R_{54}$ are the same or different and are each selected from hydrogen and dialkylamino, wherein the alkyl groups are the same or different and are each of 1 to 6 carbon atoms; $R_{52}$ is oxygen, sulfur or $NR_{55}$, wherein $R_{55}$ is the same as or different from $R_{53}$ and both $R_{55}$ and $R_{53}$ are selected from hydrogen, alkyl of 1 to 10 carbon atoms, phenyl optionally substituted at any one position with chloride, bromide, iodide, cyano, or alkyl of 1 to 4 carbon atoms, or benzyl, optionally substituted at any one position of the phenyl group with chloride, bromide, iodide, cyano, or alkyl of 1 to 4 carbon atoms.

37. The window of claim 36, wherein said electrochromic medium further comprises at least one solution-phase anodic compound where an oxidized form of said anodic compound has an $E_{SOMO}-E_{HDOMO}$ of less than 3.6 eV.

38. The window of claim 37, wherein the outer product of the SOMO and HDOMO of said anodic compound results in a long axis transition dipole moment.

39. The window of claim 37, wherein said electrochromic medium is held in a space defined by two planar, parallel, spaced-apart walls, and a periphery defined by a seal, where the side of each said walls that is in contact with said medium is coated with an electrode layer of electrically conductive material.

* * * * *